United States Patent [19]

Tajiri et al.

[11] Patent Number: 4,752,655
[45] Date of Patent: Jun. 21, 1988

[54] COORDINATE INPUT DEVICE

[75] Inventors: Tetsuo Tajiri; Yuichi Sato, both of Kanagawa, Japan

[73] Assignee: Nippon Telegraph & Telephone Corporation, Tokyo, Japan

[21] Appl. No.: 798,231

[22] Filed: Nov. 14, 1985

[30] Foreign Application Priority Data

| Nov. 16, 1984 | [JP] | Japan | 59-241921 |
| Dec. 14, 1984 | [JP] | Japan | 59-262965 |
| Jan. 10, 1985 | [JP] | Japan | 60-2454 |
| Feb. 12, 1985 | [JP] | Japan | 60-23547 |
| Feb. 12, 1985 | [JP] | Japan | 60-23548 |
| Feb. 23, 1985 | [JP] | Japan | 60-33695 |

[51] Int. Cl.$^4$ .................................... G08C 21/00
[52] U.S. Cl. ............................. 178/18; 178/20
[58] Field of Search .......................... 178/18, 19, 20

[56] References Cited

U.S. PATENT DOCUMENTS

| 3,699,439 | 10/1972 | Turner | 178/18 X |
| 4,448,837 | 5/1984 | Ikeda et al. | 178/18 X |
| 4,644,101 | 2/1987 | Jin et al. | 178/18 |

Primary Examiner—Stafford D. Schreyer
Attorney, Agent, or Firm—Roberts, Spiecens & Cohen

[57] ABSTRACT

A transparent coordinate input device can be used integrally with a display unit or overlap it and has a coordinate input panel (i.e., a transparent drawing pad). The input panel has a transparent insulating substrate, a flat transparent resistor film of a rectangular shape which is formed on the substrate, and detection electrodes, electrically connected to four sides of the transparent resistor film, for causing a current to flow along one of current flow-in and flow-out directions with respect to the transparent resistor film. The transparent coordinate input device also has a coordinate correction table for storing correction data representing the relationship between the input coordinate signals representing an input position of the electrical pen and the output coordinate signals representing a position and detected by a detector, and an operation circuit for performing coordinate correction by accessing the coordinate correction table.

24 Claims, 18 Drawing Sheets

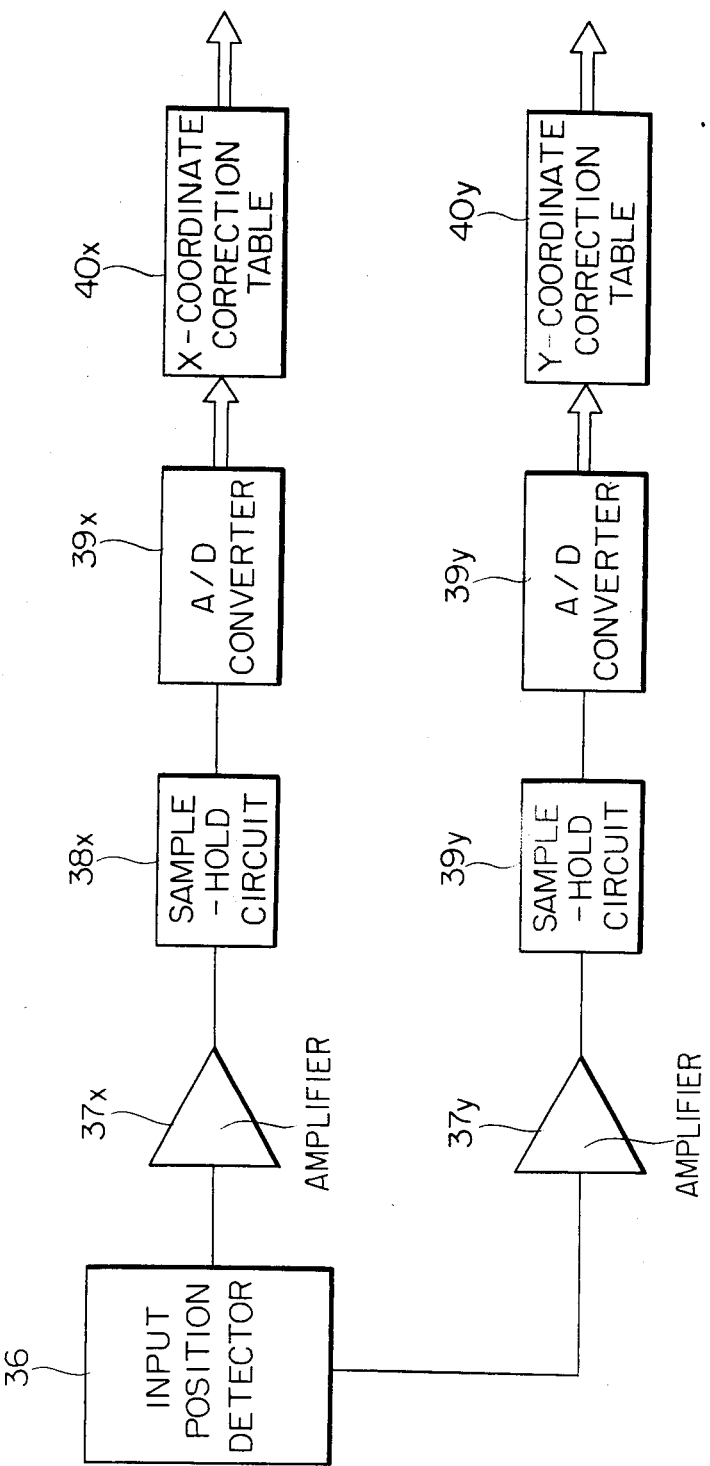

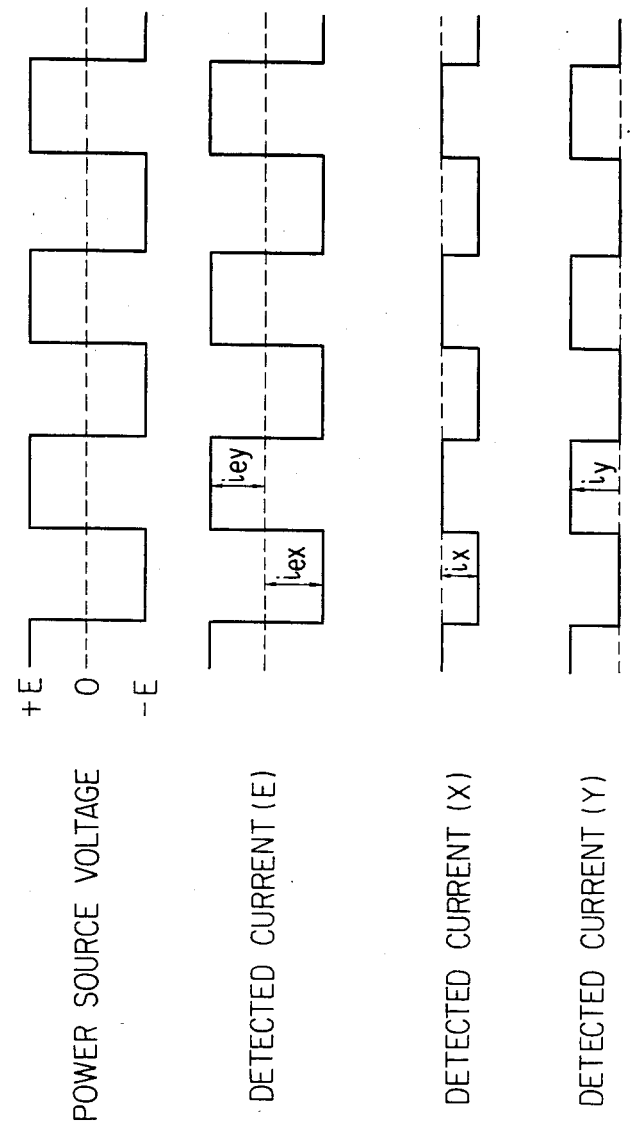

COORDINATE INPUT DEVICE

BACKGROUND OF THE INVENTION

1. Field of the Invention

The present invention relates to a transparent coordinate input device that can be used over the screen of a display unit.

2. Description of the Prior Art

Various types of coordinate input devices are commercially available. They can be classified into pressure conductive-resistive type, static coupling type, and electromagnetic induction type devices in accordance with input position detection techniques.

A conventional static coupling type coordinate input device (e.g., Japanese Patent Laid-Open No. 48-69436) uses a resistor plate with a large number of x- and y-coordinate electrodes in a peripheral region thereof and an insulating plate formed on the resistor plate. An AC voltage is applied to the electrodes of the resistor plate along the x and y directions. When an operator touches any point of the insulating plate with an input pen, an AC voltage is induced by static coupling in the input pen and the x- and y-coordinates can be detected. The static coupling type coordinate input device requires a complicated detector since AC voltage is used. Furthermore, input detection errors tend to occur due to a body effect, thereby distorting the image on the display screen.

A conventional electromagnetic induction type coordinate input device uses a large number of x and y parallel conductor loops orthogonal to each other. When the operator touches any point with an electromagnetic input pen supplied with an AC current, a voltage is induced at the x and y conductor loops near the input point. A maximum value of the induction voltage is detected to determine the x- and y-coordinates of the input point. A conventional input device of this type also requires a complicated voltage detector. In addition, detection errors tend to occur due to holding the electromagnetic input pen at an improper angle, resulting in distortion on the display screen.

A conventional pressure conductive-resistive type coordinate input device (e.g., Japanese Patent Laid-Open No. 58-87676) uses an input structure obtained by sequentially stacking a square resistor film, a pressure conductive rubber sheet, and a metal conductive film. The square resistor film has a large number of x- and y-coordinate detection electrodes on the respective sides thereof. The pressure conductive rubber sheet is rendered conductive when pressure is applied. A constant current source is connected to the conductive layer and the electrodes. When the operator touches any point (i.e., an input point) of the conductive layer with an input pen, the portion of the pressure conductive rubber sheet corresponding to the input point is rendered conductive. At least one of the current components flowing to the detection electrodes of the opposing sides with respect to the input point is detected, so that the x- and y-coordinates of the input point can be detected. With a conventional coordinate input device of this type, the x- and y-coordinates of the input point can be easily detected as compared with the devices described above. However, the following drawbacks are also present.

An input graphic or character pattern is displayed on a display unit, such as a CRT, that is external to the coordinate display device. The operator must change the field of view from the input surface to the display screen to check whether or not the input pattern has been properly entered. Therefore, effective man-machine interface cannot be achieved, and input is cumbersome and time-consuming.

In a conventional pressure conductive-resistive type coordinate input device, a constant current from a single contact current source is shunted from the input point to a pair of opposing electrodes. One of the shunted current components is measured by a detection resistor and an operational amplifier. The current to be measured is supplied to a detection resistor having a resistance sufficiently smaller than that of the resistor film. A voltage drop across the ends of the detection resistor is amplified by the operational amplifier to measure current. In order to achieve an accurate measurement, the detection resistor cannot have a high resistance, and thus the voltage drop across the ends of the resistor is small. In this sense, the operational amplifier must have a large gain and is thus sensitive to external noise.

In a conventional coordinate input device of this type, coordinate detection precision is determined solely by the sheet resistance of the resistor film. When a uniform sheet resistance cannot be obtained, the input points are distorted on the display screen.

SUMMARY OF THE INVENTION

It is, therefore, a principal object of the present invention to solve the conventional problems described above and to provide a high-precision transparent coordinate input device with a transparent coordinate input panel which can be used overlapping the screen of a display unit or can be coupled together with the display unit.

It is another object of the present invention to provide a transparent coordinate input device with a transparent coordinate input panel, wherein a transparent resistor film is used to constitute the coordinate input panel, is substantially free from wear and has high durability.

It is still another object of the present invention to provide a circuit in the transparent coordinate input device, such that an input position can be detected with high precision even if the sheet resistance of the transparent resistor film is not uniform.

A coordinate input panel in a transparent coordinate input device according to the present invention comprises: a transparent insulating substrate, a flat square transparent resistor film formed on the substrate, and detection electrodes electrically connected to the sides of the transparent resistor film to allow a current flow along one of flow-in and flow-out directions with respect to the transparent resistor film.

According to an aspect of the present invention, the coordinate input panel has a structure wherein a transparent protective layer with a planar resistance sufficiently higher than that along the direction of thickness thereof is formed on the upper surface of the transparent resistor film, thereby preventing damage to the transparent resistor film when it is touched by an electrical pen.

According to another aspect of the present invention, the transparent input device of the present invention comprises: a power source circuit, electrically connected to an electrical pen, for supplying a drive current to the transparent resistor film from an input position;

and detecting means, connected to the detection electrodes, for detecting the x- and y-coordinates of the input position specified by the electrical pen. The power source circuit comprises a drive voltage power source, one end of which is connected to the electrical pen, and a pair of constant-current circuits for maintaining currents flowing from the input position to the pair of detection electrodes at a constant value. The detecting means comprises a pair of operation circuits for detecting a potential difference between the opposing detection electrodes and for generating a signal representing the input position specified by the electrical pen. With the above arrangement, high-precision position detection relatively immune to external noise can be reliably performed.

According to still another aspect of the present invention, there is provided a transparent coordinate input device comprising correcting means for correcting an input position detection error, namely, the difference between the input position specified by the electrical pen and the detection position obtained by the detecting means.

The correcting means comprises a coordinate correction table, for storing data needed for correcting an input position detection error, and operating means for correcting the error by retrieving data from the coordinate correction table.

The correction data comprises coordinate correction coefficients $C_x$ ($=I_x/O_x$) and $C_y$ ($=I_y/O_y$) given as ratios of coordinates $I_x$ and $I_y$ entered on the coordinate input panel, or coordinate correction differences $D_x$ ($=I_x-O_x$) and $D_y$ ($=I_y-O_y$) between the input coordinates $I_x$ and $I_y$ and the detected coordinates $O_x$ and $O_y$.

According to still another aspect of the present invention, correction data is not prepared for all points, but rather for a small number of representative points. Correction is performed using the correction data of the representative point nearest the input position.

For this purpose, a typical arrangement comprising a correction table for storing correction data of representative points is accessed such that a plurality of upper bits of the coordinates $O_x$ and $O_y$ are used as address data. There is provided another arrangement using a converter to convert the detected coordinates $O_x$ and $O_y$ to the coordinates of the nearest representative point. The converter comprises an offset table for storing an offset value, representing the distance between the detected position and the corresponding representative point, and a subtracter for reading out the corresponding offset value from the offset table, subtracting the corresponding offset value from the coordinates $O_x$ and $O_y$, and generating addresses at which the correction data of the nearest representative point is generated.

According to still another aspect of the present invention, in order to obtain correction data for performing high-precision correction using a small coordinate correction table storing only a small number of correction data, there is provided a correction table for storing correction data representing a plurality of the nearest representative points and data representing differences between the correction data, and an interpolation circuit for performing interpolation with these data.

According to still another aspect of the present invention, there is provided a transparent coordinate input display device having correction data input means for easily and accurately entering correction data in the coordinate correction table, wherein a coordinate input unit is integrally coupled to a coordinate display unit.

According to another aspect of the present invention, the correction data input means comprises a coordinate generator for generating digital coordinate data, means for causing the coordinate display unit to display a coordinate represented by an output from the coordinate generator, an operation circuit for calculating coordinate data detected by the coordinate input unit and the coordinate data generated by the coordinate generator to obtain coordinate correction data when the position displayed on the display unit is touched by the electrical pen, and means for storing an output from the operation circuit in the coordinate correction table.

Other objects, the features and advantages of the invention will be apparent from the following detailed description when read with the accompanying drawings which show, by way of example and not limitation, device for realizing the presently preferred embodiment of the invention.

BRIEF DESCRIPTION OF THE DRAWINGS

FIG. 7 is a block diagram of a coordinate input device having an input position correction circuit according to another embodiment of the present invention;

FIG. 24 is a timing chart for explaining the device shown in FIG. 23.

DESCRIPTION OF THE PREFERRED EMBODIMENTS

Figure 1:
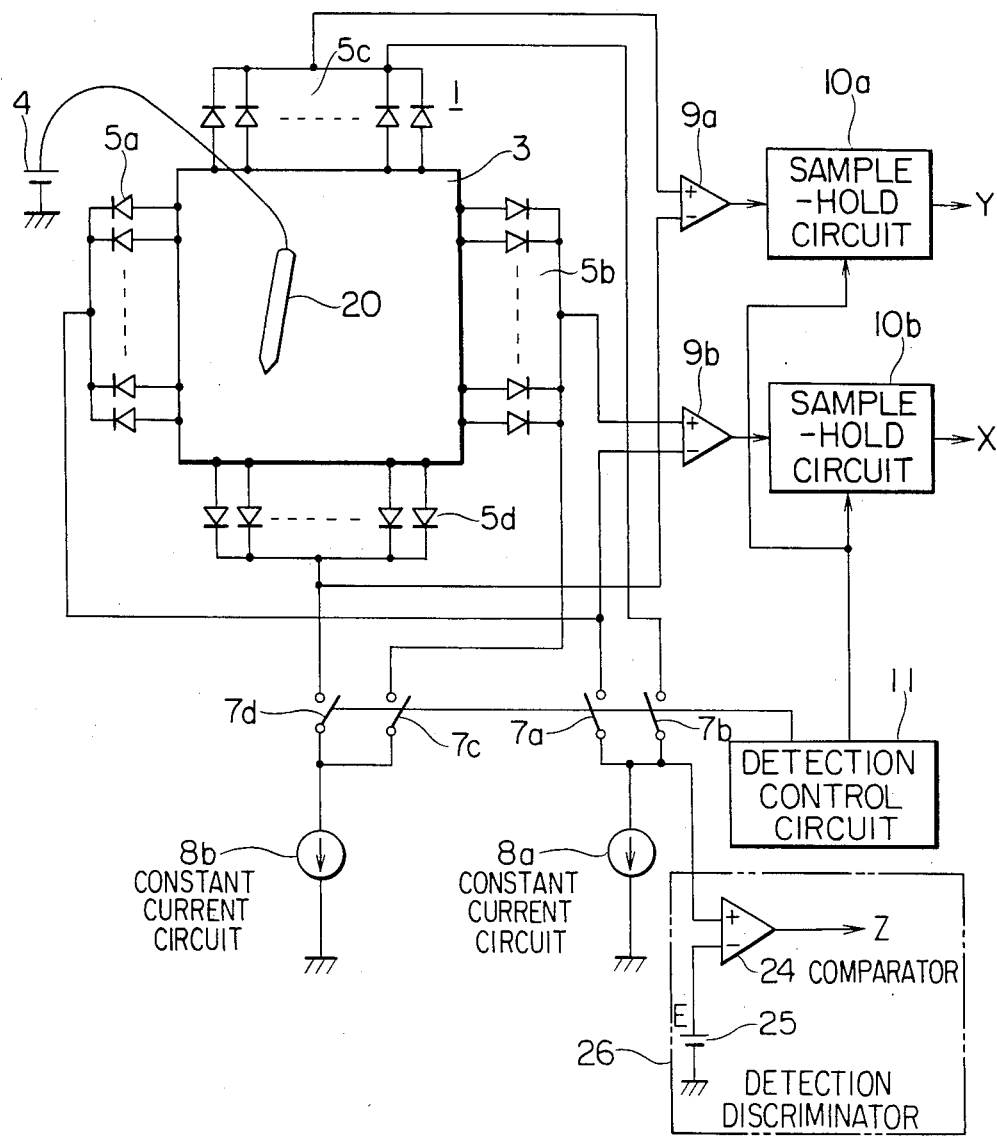
FIG. 1 is a diagram showing a coordinate input device according to an embodiment of the present invention.
Figure 2:
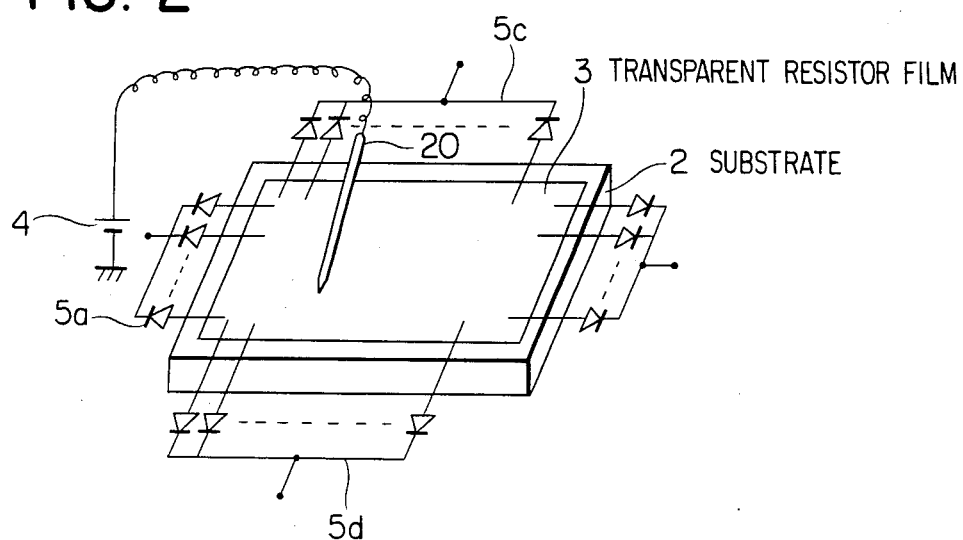
FIG. 2 is a perspective view showing a schematic configuration of a coordinate input panel (i.e., a drawing pad)

FIG. 1 shows a coordinate input device according to an embodiment of the present invention, and FIG. 2 is a perspective view of a coordinate input panel 1. The coordinate input panel 1 comprises a substrate 2 of transparent glass, plastic or the like, a transparent resistor film 3 formed on the substrate 2, and detection electrodes 5a, 5b, 5c and 5d respectively connected to four sides of the transparent resistor film 3. The major surface of the resistor film 3 serves as an input surface. The transparent resistor film 3 is formed such that an $S_nO_2$ or IOT material is deposited by CVD (Chemical Vapor Deposition) or by spraying, so as to obtain a uniform resistance throughout the surface of the film. When an $S_nO_2$ material is used, the transparent resistor film 3 has a thickness of, for example, about 500 Å. In this case, sheet resistance is about 100 to 200 $\Omega/cm^2$. The detection electrodes 5a, 5b, 5c and 5d include diodes for preventing feedback of the current to the transparent resistor film 3. Cathodes of the plurality of diodes are spaced equidistantly (e.g., at intervals of 2 mm) and are connected by a conductive adhesive to the periphery of the transparent resistor film 3. The anodes of the diodes in the respective detection electrodes 5a, 5b, 5c and 5d are commonly connected.

Constant current sources 8a and 8b are connected between the detection electrode 5a and ground by a switch 7a and between the detection electrode 5b and ground by a switch 7c, respectively. The detection electrodes 5c and 5d are grounded through switches 7a and 7c and the constant current sources 8a and 8b, respectively. Operational amplifiers 9a and 9b are connected between the detection electrodes 5c and 5d and between the detection electrodes 5a and 5b, respectively. The operational amplifiers 9a and 9b detect corresponding potential differences and amplify the potential differences. The amplified potential differences are supplied as y- and x-coordinates of the input point to sample-hold circuits 10a and 10b, respectively.

A detection control circuit 11 alternately operates the pair of switches 7a and 7b and the pair of switches 7c and 7d. In synchronism with this switching, the sample-hold circuits 10a and 10b perform a sample-hold operation. A detection discriminator 26 comprises a comparator 24 and a reference power source 25. The detection discriminator 26 is included in the operational amplifiers 9a and 9b. In the detection discriminator 26, the comparator 24 compares potentials at the detection electrodes 5a and 5d with a voltage $E_1$ of the reference power source 25. When the potential at the detection electrode 5a or 5d exceeds the voltage $E_1$, the comparator 24 generates a Z signal of "H" level. When the Z signal is set at "H" level, the discriminator 26 determines that an input (depression) has been made. In this case, input x- and y-coordinate signals are detected as significant data, thereby preventing input errors in the computer.

Figure 3:
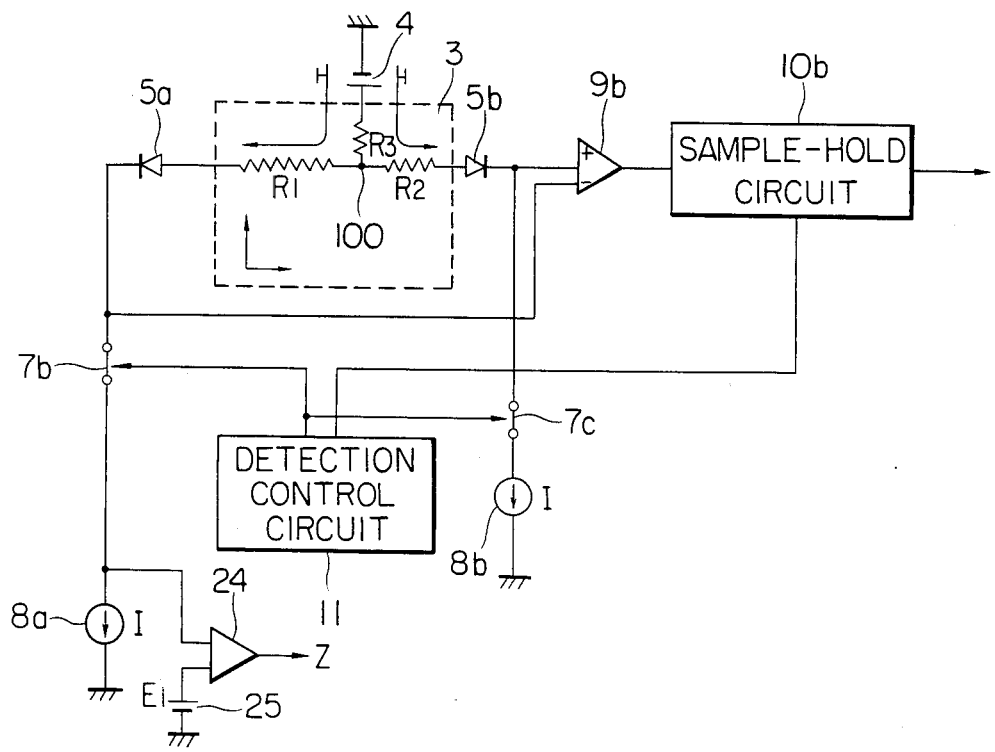
FIG. 3 is a circuit diagram for explaining the principle of operation of the device shown in FIG. 1.

FIG. 3 is an equivalent circuit for explaining the operation of the device shown in FIG. 1. In this circuit, an electrical pen 20 is in electrical contact with the transparent resistor film 3 at an input point, so that the switches 7a and 7c are closed while the switches 7b and 7d are opened. In other words, the circuit shows an operation state wherein an x-coordinate is detected.

Referring to FIG. 2, when a voltage E from a drive voltage power source 4 is applied at an input position 30, constant currents I flow between the detection electrode 5a and the input position 30 and between the detection electrode 5b and the input position 30. Reference symbol $R_3$ denotes a contact resistor between the electrical pen 20 and the transparent resistor film 3. The transparent resistor film 3 has a uniform resistance. A resistor $R_1$ between the input position 30 and the detection electrode 5 is proportional to that of an x-coordinate of the input position. When the difference between a voltage $R_1I$, obtained by flowing the constant current I through the resistor $R_1$, and a voltage $R_2I$, obtained by flowing the constant current I through the resistor $R_2$, is measured, the x-coordinate of the input position can be detected. A voltage $V = R_1I - R_2I$ is calculated by the operational amplifier 9b.

The voltage $V_x = R_1I - R_2I$ is expressed as follows when the resistance between the detection electrodes 5a and 5b is given as R ($= R_1 + R_2$):

$$V_x = R_1I - (R - R_1)I$$
$$= 2R_1I - RI$$

Since the current I is a constant current and the resistor R is also constant, the voltage $V_x$ is proportional to the resistance of the resistor $R_1$. The resistance of the resistor $R_1$ is proportional to a distance x between the input position and the detection electrode 5a. Therefore, the voltage $V_x$ is obtained as a value proportional to the distance x.

The x-coordinate signal is held in the sample-hold circuit 10b while the y-coordinate is being detected (i.e., the switches 7a and 7c are opened and the switches 7b and 7d are closed).

Voltage drops across the diodes of the detection electrodes 5a, 5b, 5c and 5d can be detected and corrected, since currents flowing through those electrodes are constant.

In the coordinate input device of this embodiment described above, the detection electrodes are arranged at four sides of the transparent resistor film formed on the input surface, and currents flowing through the detection electrodes are kept constant upon application of the drive voltage thereto, so that x- and y-coordinates of the input point can be detected on the basis of the potential differences between the opposing detection electrodes. Therefore, the detection operation is substantially free from external noise, and high-precision position detection can be reliably performed.

Figure 4:
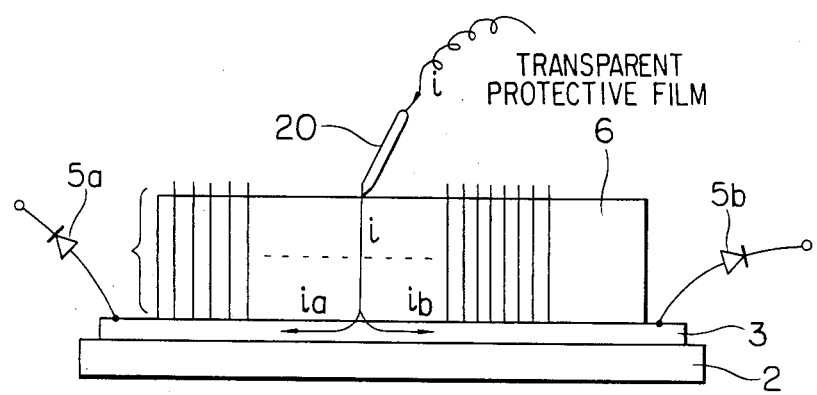
FIGS. 4 and 5 are respectively sectional views of a drawing pad having a coordinate input surface with a transparent protective film.

FIG. 4 is a sectional view showing another arrangement of a coordinate input panel (i.e., a transparent drawing pad) 1. A transparent protective film 6 is formed on the transparent resistor film 3 of FIG. 2. The resistance of the transparent protective film 6 along its thickness is sufficiently smaller (1/100 or less) than the planar resistance thereof. The transparent protective film is obtained by embedding conductive wires in a transparent polymer along a longitudinal direction thereof. Since a current flows only along the longitudinal direction, an electrical pen 20 is brought into contact with the surface of the transparent protective film 6, a current flows in the transparent resistor film 3 and then the electrodes 5a and 5b, thereby detecting x- and y-coordinates of the input point. In this manner, the transparent resistor film 3 is not contacted directly by the electrical pen 20 but is protected by the thin transparent film. Therefore, the transparent resistor film is not easily worn out, and a long lifetime and high precision are guaranteed. The conductive wire may be replaced with carbon fiber, conductive fabric or metallic powder.

Figure 5:
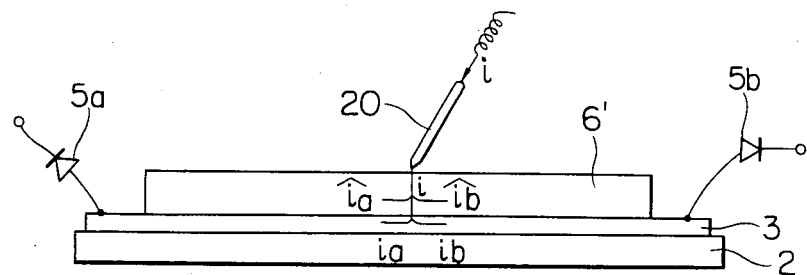
Figure 6:
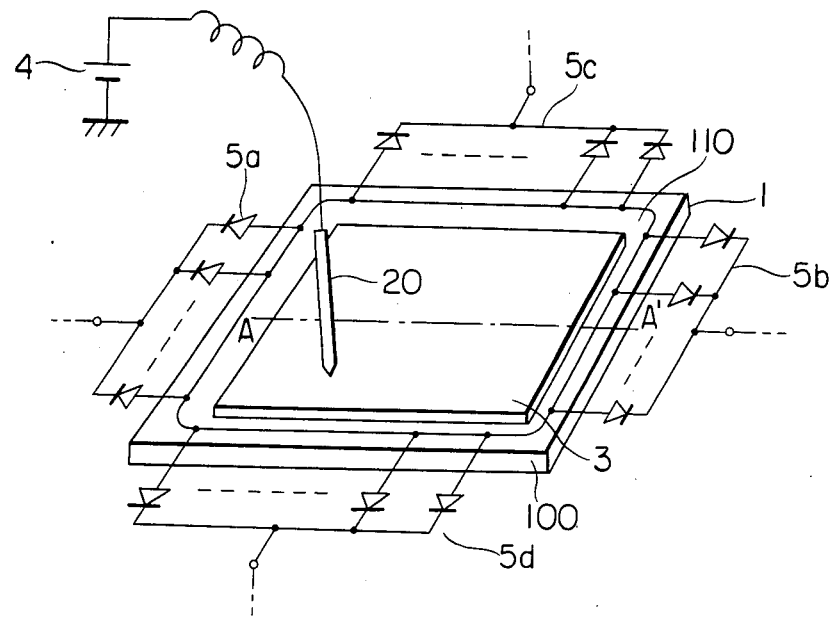
FIG. 6 is a perspective view of the drawing pad shown in FIGS. 4 and 5.

FIG. 5 shows a transparent protective film 6' having a higher resistance than the transparent resistor film 3. When the electrical pen 20 comes in contact with the transparent protective film 6', a current does not flow throughout the surface of the transparent protective film 6' since it has a higher resistance but only through the transparent resistor film 3 and then the detection electrodes 5a and 5b. Therefore, even if the transparent protective film 6' is degraded and its resistance varies, coordinate detection errors will not occur, thereby contributing to a long lifetime and high precision operation.

A transparent pressure conductive sheet 6" may be used in place of the transparent protective films 6 and 6' on the coordinate input panels 1 of FIGS. 4 and 5. The transparent pressure conductive sheet 6" is rendered electrically conductive along its thickness at an input point when a pressure of a predetermined value or more is applied to the input point.

In the embodiment shown in FIG. 1, since the sheet resistance of the transparent resistor film 3 is not uniform, a linear relationship between an input position and an output position (i.e., a display position) cannot be obtained, resulting in a detection error of a display image with respect to an input image.

Transparent coordinate input devices for correcting such detection errors and performing high-precision input according to other embodiments of the present invention will be described hereinafter.

FIG. 7 is a block diagram of a correction circuit with a correction table for storing correction data representing the relationship between coordinates $I_x$ and $I_y$ of an input position and detected coordinates $O_x$ and $O_y$.

An input position detector 36 corresponds to the device shown in FIG. 1. The correction circuit includes amplifiers $37_x$ and $37_y$ for amplifying x- and y-coordinates detected by the input position detector 36, sample-hold circuits $38_x$ and $38_y$ for sampling and holding outputs from the amplifiers $37_x$ and $37_y$, respectively, A/D converters $39_x$ and $39_y$ for converting analog outputs from the sample-hold circuits $38_x$ and $38_y$, respectively, to digital signals, and x- and y-coordinate correction tables $40_x$ and $40_y$ for correcting outputs from the A/D converters $39_x$ and $39_y$, respectively.

In operation, x- and y-coordinate signals detected by the input position detector 36 are amplified by the amplifiers $37_x$ and $37_y$ to a predetermined level. Amplified outputs are sampled and held by the sample-hold circuits $38_x$ and $38_y$. The analog x- and y-coordinate signals are then converted by the A/D converters $39_x$ and $39_y$ to digital signals. Finally, the digital x- and y-coordinate signals are supplied to the x- and y-coordinate correction tables $40_x$ and $40_y$ to generate x- and y-coordinate signals corrected in correspondence with the digital x- and y-coordinate signals.

Figure 8:
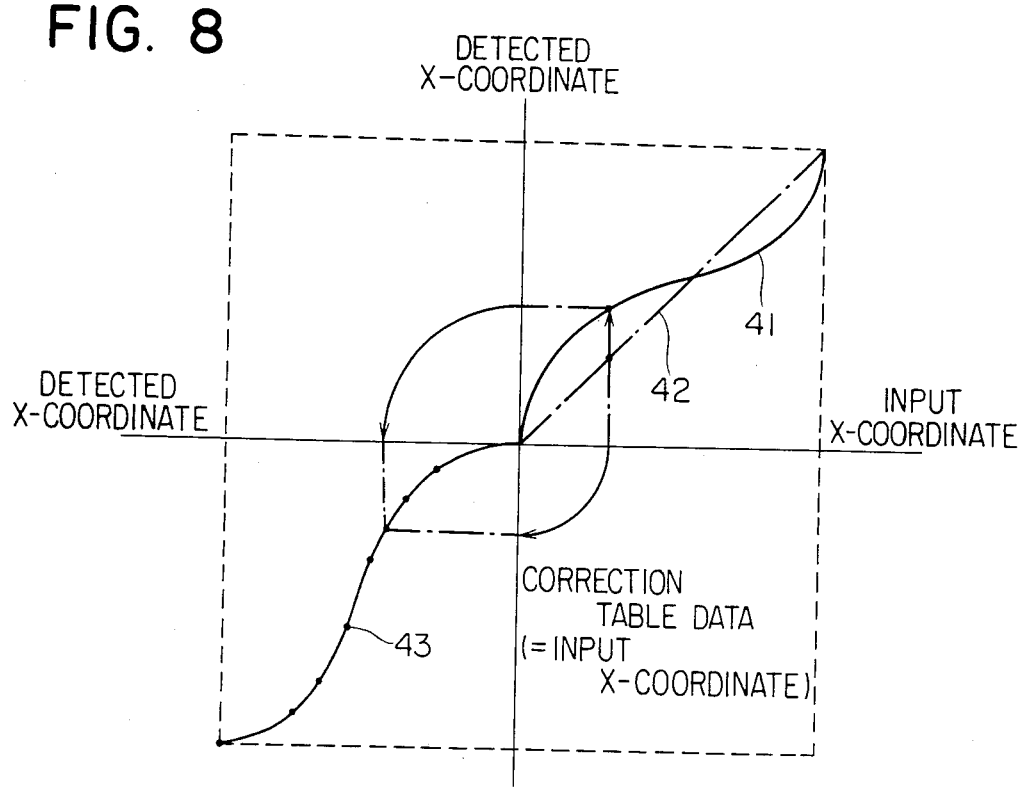
FIG. 8 is a graph for explaining a correction table in the device of FIG. 7.

FIG. 8 shows the relationship between the x-coordinate signal and the correction table. Referring to FIG. 8, reference numeral 41 denotes a characteristic curve showing the relationship between the x-coordinate input position detected by the input position detector 36 and the x-coordinate signal therefrom. Since the sheet resistance of the resistor film of the input position detector 36 is not uniform, a linear output cannot be obtained, so that a deviation between the curve 41 and a line 42 representing the ideal relationship is given as an x-coordinate detection error. Reference numeral 43 denotes a characteristic curve representing x-coordinate data written in the x-coordinate correction table 40. The input x-coordinate signal is used as address data for accessing the correction table 40, thereby generating the digital x-coordinate signal.

With the arrangement described above, even if an input position detection error occurs due to a nonuniform sheet resistance of the resistor film, the input position can be corrected with high precision. Therefore, even a coordinate input device having a nonuniform resistance can be used without trouble. The yield of the resistor films can be increased, so that the coordinate input devices can be manufactured at low cost. The x-coordinate is given as a convenient illustration. However, the same correction operation can be performed for the y-coordinate. In the block diagram of the input position correction circuit, the pair of sample-hold circuits $38_x$ and $38_y$ and the pair of A/D converters $39_x$ and $39_y$ are used. However, when x- and y-coordinate signals are time-divisionally driven, only one sample-hold circuit and one A/D converter can be used. The x- and y-coordinate correction tables $40_x$ and $40_y$ may consist, for example, of ROMs (Read-Only Memory). The corrected x-coordinate signal is stored in the ROM, and the digital x- or y-coordinate signal from the A/D converter $39_x$ or $39_y$ can be used an address signal to read out the data from the ROM. It should be noted that the correction data for all input points detected by the input position detector 36 can be prepared, or correction data for only representative points detected by the input position detector 36 can be prepared to obtain the correction data of all input points by interpolation since the resistance of the resistor film 3 gradually changes.

Figure 9:
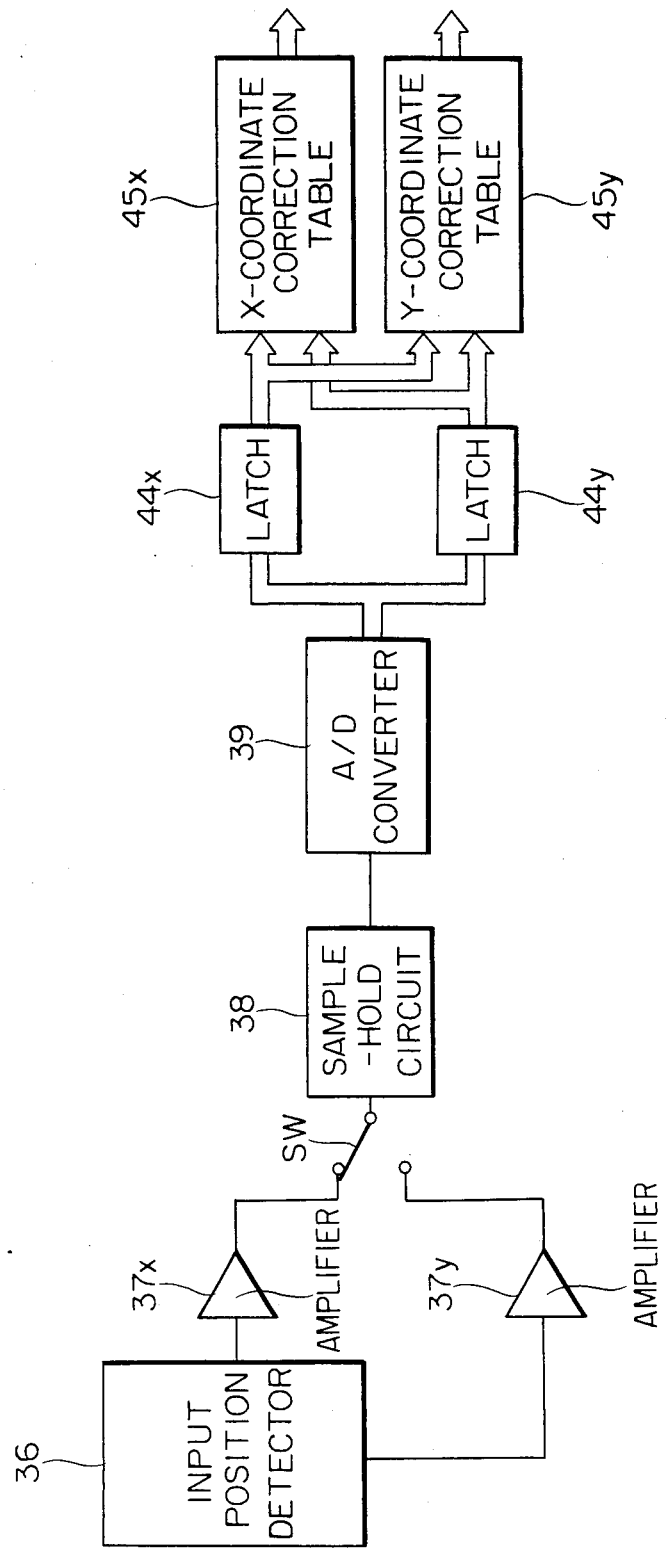
FIG. 9 is a block diagram of a coordinate input device having an input position correction circuit for time-divisionally driving a sample-hold circuit and an A/D converter according to still another embodiment of the present invention.

FIG. 9 shows a coordinate input device with another correction circuit according to another embodiment of the present invention. Reference numeral 38 denotes a sample-hold circuit; and 39, an A/D converter. Reference symbol SW denotes a switch. Reference numeral 44$_x$ denotes an x-coordinate data latch; 44$_y$, a y-coordinate data latch; 45$_x$, an x-coordinate correction table; and 45$_y$, a y-coordinate correction table.

The x- and y-coordinate signals detected by the input position detector 36 are amplified by amplifiers 37$_x$ and 37$_y$ to a predetermined level. Amplified outputs are time-divisionally switched by the switch SW between the x- and y-coordinate signals. The sample-hold circuit 38 performs sampling and holding in synchronism with a switching timing of the switch SW. The analog x- and y-coordinate signals are time-divisionally converted by the A/D converter 39 to digital signals. When the output signal represents the digital x-coordinate data, it is latched by the latch 44$_x$. Otherwise, the output from the A/D converter 39 is latched by the latch 44$_y$. The digital x- and y-coordinate signals are simultaneously used as address data to access the correction table 45 to obtain the corrected x- and y-coordinate data.

Figure 10:
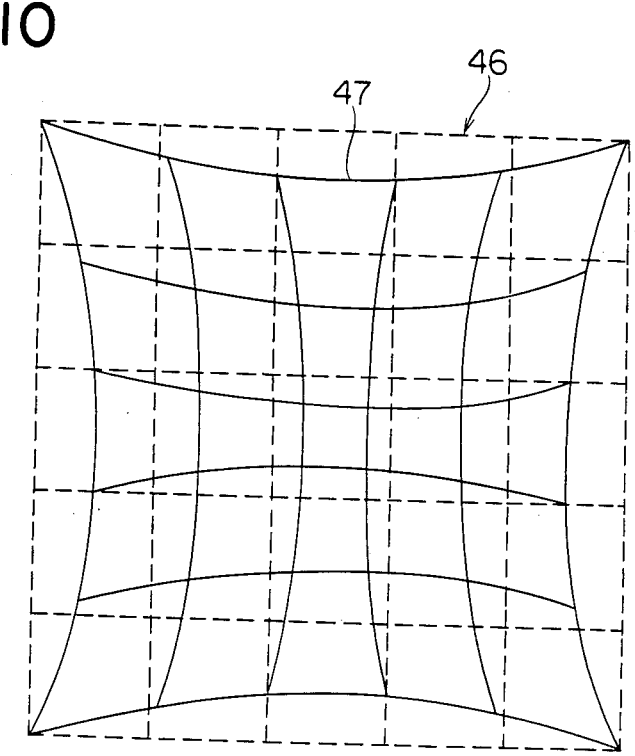
FIG. 10 is a graph for explaining the relationship between the input position and the coordinate signal in the device of FIG. 9.

FIG. 10 shows the relationship between the input position detected by the input position detector 36 and the coordinate signal. Reference numeral 46 denotes an input position; and 47, a position signal. The nonuniform resistance of the resistor film of the input position detector 36 along the x direction is not independent of that along the y direction, and x- and y-coordinate detection errors must be corrected throughout the surface of the input position detector 36. Data representing the input position 46 is stored in the correction table 45 of FIG. 9 when the position signal 47 of FIG. 10 is entered.

With the above arrangement, even if an input position detection error occurs due to nonuniform resistance of the resistor film, the input data can be corrected by the correction table to detect the input position with high precision.

Figure 11:
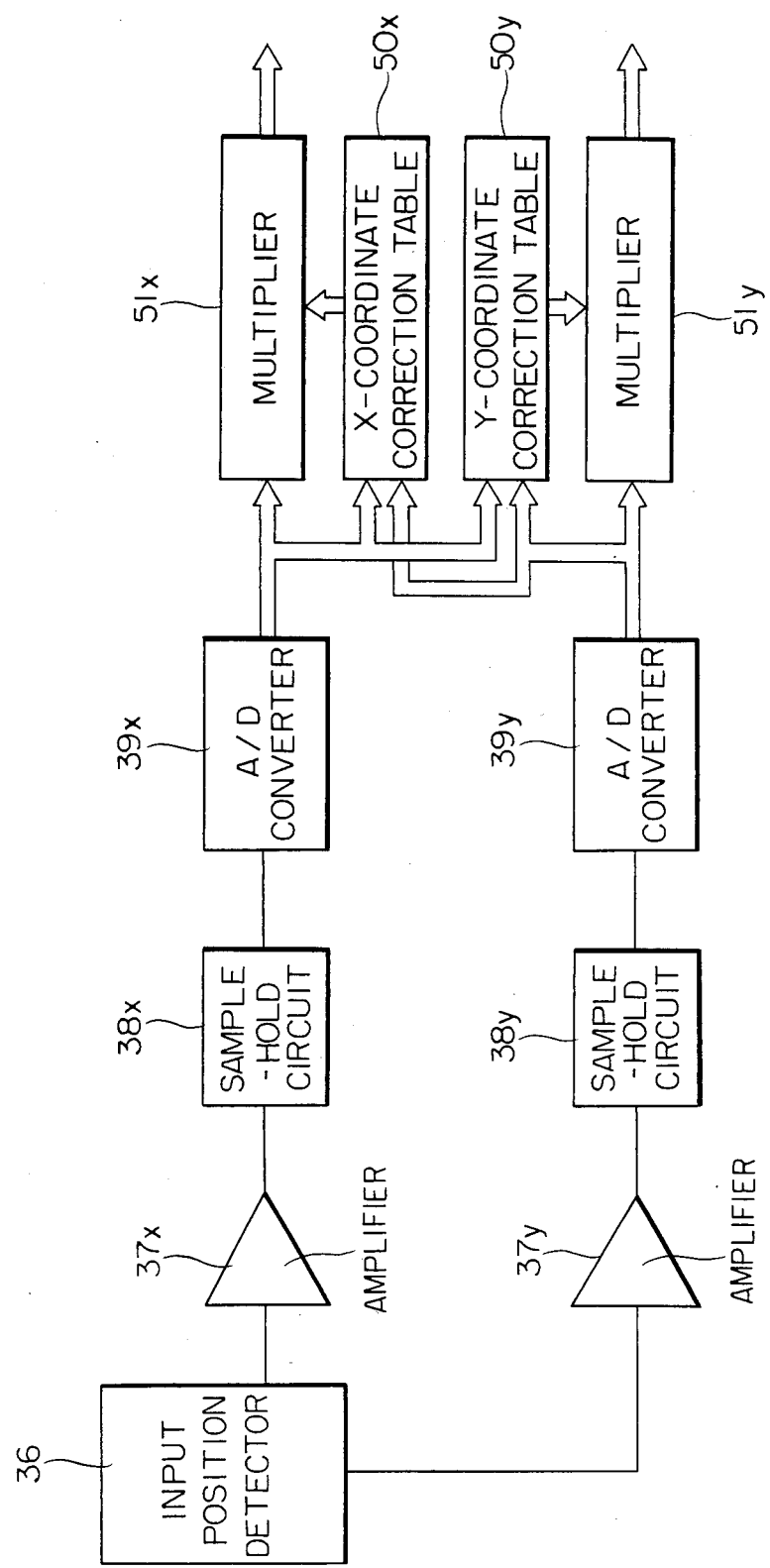
FIG. 11 is a block diagram of a coordinate input device having an input position correction circuit for performing correction by using a small coordinate correction table according to still another embodiment of the present invention.

FIG. 11 is a block diagram of a coordinate input device with a correction circuit for correcting an input position detected by an input position detector in accordance with correction data stored in small coordinate correction tables according to still another embodiment of the present invention. Coordinate correction tables 50$_x$ and 50$_y$ store coordinate correction coefficients C$_x$ (I$_x$/O$_x$) and C$_y$ (I$_y$/O$_y$) as ratios of input position coordinates I$_x$ and I$_y$ to detected coordinates O$_x$ and O$_y$. Outputs (i.e., the coordinates O$_x$ and O$_y$) from A/D converters 39$_x$ and 39$_y$ are used as x and y address signals to access the coordinate correction tables 50$_x$ and 50$_y$, respectively. Multipliers 51$_x$ and 51$_y$ multiply the outputs from the A/D converters 39$_x$ and 39$_y$ with the coordinate correction coefficients accessed in response thereto, so that corrected coordinate position signals are generated by the multipliers 51$_x$ and 51$_y$. Other arrangements of the correction circuit are the same as those of FIG. 7.

In operation, x- and y-coordinate signals from the input position detector 36 are amplified by amplifiers 37$_x$ and 37$_y$ to a predetermined level. Amplified outputs are sampled and held by sample-hold circuits 38$_x$ and 38$_y$, and sampled outputs are then converted by A/D converters 39$_x$ and 39$_y$ to digital x- and y-coordinate signals. The x- and y-coordinate correction coefficients, corresponding to the x- and y-coordinate signals obtained by supplying the digital x- and y-coordinate signals as address signals to the x- and y-coordinate correction tables 50$_x$ and 50$_y$, are multiplied by the multipliers 51$_x$ and 51$_y$ with the digital x- and y-coordinate signals, thereby obtaining the corrected x- and y-coordinate signals.

Figure 12:
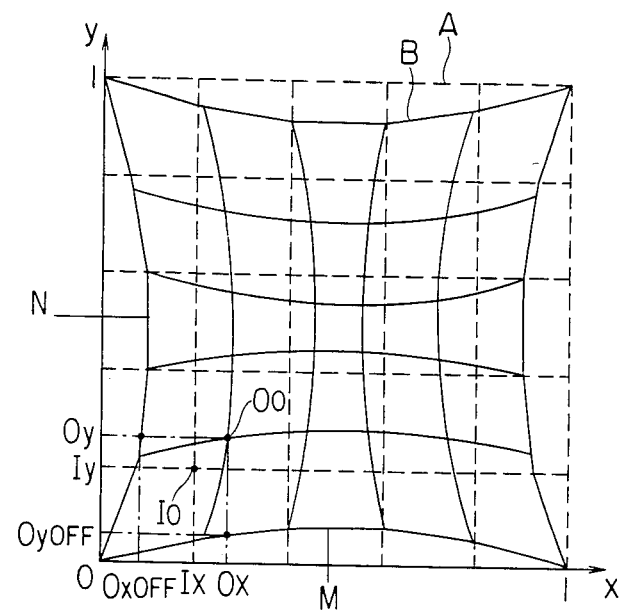
FIG. 12 is a graph for explaining the relationship between the coordinate signal and the coordinate correction value in the device of FIG. 11.

FIG. 12 shows the relationship between the coordinate signal and the coordinate correction coefficient. Reference symbol A denotes an input coordinate; and B, a coordinate detection value. FIG. 12 shows coordinate signals O$_0$ (O$_x$,O$_y$) generated by the input position detector 36 upon detection of coordinates I$_0$ (I$_x$,I$_y$) In this case, x- and y-coordinate correction coefficients C$_x$ and C$_y$ are given as follows:

$$C_x = I_x/O_x \text{ and } C_y = I_y/O_y$$

When the x- and y-coordinate correction coefficients C$_x$ and C$_y$ are written at the addresses (O$_x$,O$_y$) of the x- and y-coordinate correction tables 50$_x$ and 50$_y$, the corrected x- and y-coordinate signals O$_x'$ and O$_y'$ are:

$$O_x' = O_x \times C_x = O_x \times (I_x/O_x) = I_x$$

$$O_y' = O_y \times C_y = O_y \times (I_y/O_y) = I_y$$

The same coordinates as the coordinates I$_0$ (I$_x$,I$_y$) entered to the input position detector 36 are generated, thereby correcting the input coordinates.

The coordinate detection error in the input position detector 36 of FIG. 11 is rarely subjected to steep changes, as shown in FIG. 12. The coordinate correction coefficients need not be prepared for the entire surface of the input position detector 36. The coefficients can be prepared for several representative points on the input surface of the input position detector 36 and can be used to correct input points near the representative points.

Figure 13:
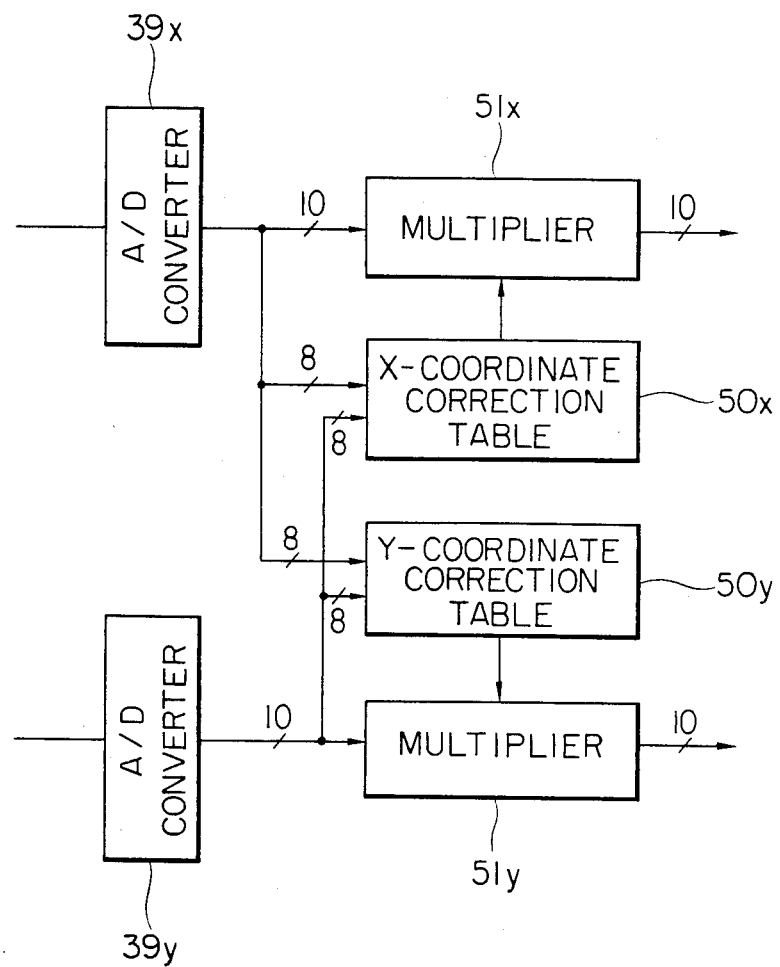
FIG. 13 is a block diagram of a coordinate input device having a table access circuit for accessing a coordinate correction table by using upper bits of the output from the A/D converter when the coordinate correction table stores coordinate correction coefficients representing only the representative points according to still another embodiment of the present invention.

FIG. 13 is a circuit diagram for implementing the method described above according to still another embodiment of the present invention. The illustrated portion is a circuit different from the corresponding portion of the circuit of FIG. 11. The resolution of each of the A/D converters 39$_x$ and 39$_y$ is given as 10 bits. 10-bit data from the A/D converters 39$_x$ and 39$_y$ is supplied to multipliers 51$_x$ and 51$_y$, respectively. The upper eight bits of each of the digital x- and y-coordinate data are supplied to the corresponding x- and y-coordinate correction tables 50$_x$ and 50$_y$. When the coordinate detection errors are small, the number of bits constituting the data supplied to the x- and y-coordinate correction tables 50$_x$ and 50$_y$ can be decreased. For this reason, the number of x-coordinate correction coefficients stored in the x-coordinate correction table 50$_x$ is $2^{16}$, 1/16 when the correction coefficients for all input points are prepared.

With the above arrangement, even if coordinate detection errors occur in the input position detector 36, the output therefrom is multiplied by the x- and y-coordinate correction coefficients stored in the x- and y-coordinate correction tables 50$_x$ and 50$_y$, thereby detecting the input position with high precision. For illustrative convenience, the pair of amplifiers 37$_x$ and 37$_y$, the pair of sample-hold circuits 38$_x$ and 38$_y$, and the pair of A/D converters 39$_x$ and 39$_y$ are used. However, when the x- and y-coordinate signals are time-divisionally driven, only one amplifier, one sample-hold circuit, and one A/D converter are required, just as in FIG. 9.

Figure 14:
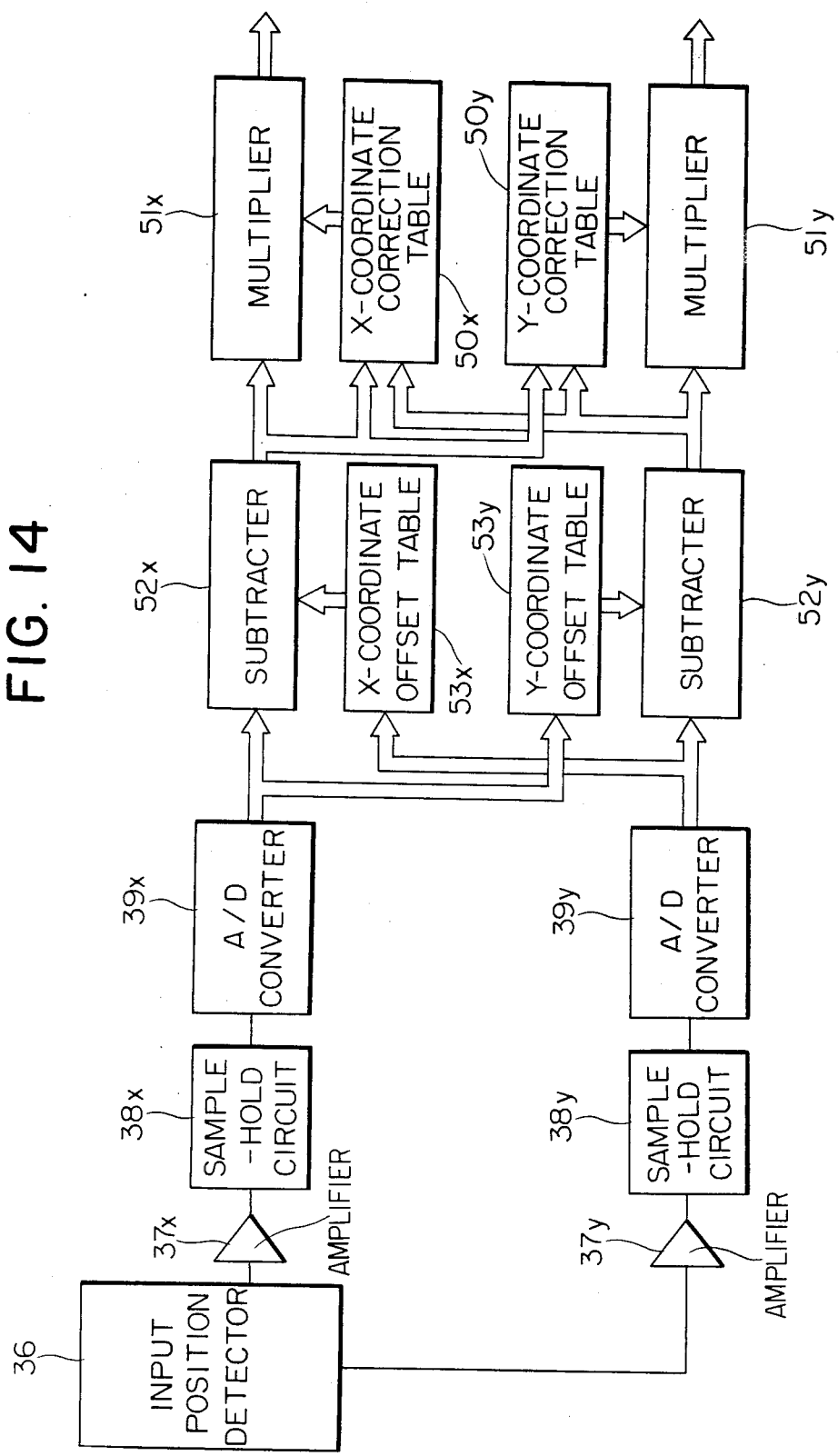
FIG. 14 is a block diagram of a circuit for improving input precision along the x- and y-axes according to still another embodiment of the present invention.

FIG. 14 shows a block diagram of a circuit for improving input precision along the x- and y-axes. The circuit subtracts offset values from the input x- and y-coordinate signals and corrects the obtained signal. An x-coordinate offset value $O_{xOFF}$ for the detected x-coordinate $O_x$ is given by curve N in FIG. 12, and a y-coordinate offset value $O_{yOFF}$ for the detected y-coordinate $O_y$ is given by curve M in FIG. 12.

The correction circuit comprises x- and y-coordinate offset tables $53_x$ and $53_y$ for storing offset values $O_{xOFF}$ and $O_{yOFF}$, representing the difference between the input point and the nearest representative point, and subtracters $52_x$ and $52_y$ for subtracting the offset values read out from the corresponding coordinate offset tables from the outputs of the A/D converters. Other arrangements of the circuit of FIG. 14 are substantially the same as those of FIG. 11.

In operation, assume that coordinate signals $O_0$ ($O_x$, $O_y$) are generated by the input position detector 36, as is exemplified by the relationship between the coordinate signals and the coordinate correction coefficients of FIG. 12. The offset value $O_{xOFF}$ of the x-coordinate signal $O_x$ of the coordinate signals $O_0$ ($O_x$, $O_y$) is stored at the address $O_y$ of the x-coordinate correction table $53_x$. Similarly, the offset value $O_{yOFF}$ of the y-coordinate signal $O_y$ of the coordinate signals $O_0$ ($O_x$, $O_y$) is stored at the address $O_y$ of the y-coordinate correction table $53_y$. The following x- and y-coordinate correction coefficients $C_x$ and $C_y$ are stored at addresses ($O_x - O_{xOFF}$, $O_y - O_{yOFF}$) of x- and y-coordinate tables $50_x$ and $50_y$:

$$C_x = I_x/(O_x - O_{xOFF})$$

$$C_y = I_y/(O_y - O_{yOFF})$$

The coordinates $I_0$ ($I_x$, $I_y$) detected by the input position detector 36 are amplified by amplifiers $37_x$ and $37_y$ to a predetermined level, and amplified outputs are sampled and held by sample-hold circuits $38_x$ and $38_y$. Outputs from the sample-hold circuits $38_x$ and $38_y$ are then converted by A/D converters $39_x$ and $39_y$ to digital x- and y-coordinate signals.

The digital x- and y-coordinate signals $O_x$ and $O_y$ are used as address signals to access the x- and y-coordinate offset tables $53_x$ and $53_y$. The x- and y-coordinate offset values $O_{xOFF}$ and $O_{yOFF}$ are subtracted by subtracters $52_x$ and $52_y$ from the digital x- and y-coordinate signals $O_x$ and $O_y$, respectively. The x- and y-coordinate correction tables $50_x$ and $50_y$ are accessed in response to the differences ($O_x - O_{xOFF}$) and ($O_y - O_{yOFF}$) to read out the x- and y-coordinate correction coefficients:

$$C_x = I_x/(O_x - O_{xOFF})$$

$$C_y = I_y/(O_y - O_{yOFF})$$

The difference ($O_x - O_{xOFF}$) is multiplied by the multiplier $51_x$ with the x-coordinate correction coefficient $C_x$ in the following manner:

$$(O_x - O_{xOFF}) \times C_x = (O_x - O_{xOFF}) \times I_x/(O_x - O_{xOFF})$$
$$= I_x$$

The product $I_x$ is generated as the corrected x-coordinate signal. Similarly, the multiplier $51_y$ performs a multiplication of ($O_y - O_{yOFF}$) × $C_y$, and produces the product $I_y$.

With the above arrangement of this embodiment, even if a coordinate detection error occurs in the input position detector 36 in the same manner as in the embodiment of FIG. 11, offset values are subtracted from the x- and y-coordinate detected values and the coordinate correction coefficients stored in the coordinate correction tables are then multiplied with the obtained signals. Therefore, the input position can be detected with high precision. In particular, according to this embodiment, high-precision detection can be guaranteed throughout the entire input surface, let alone portions near the input x- and y-coordinates.

Figure 15:
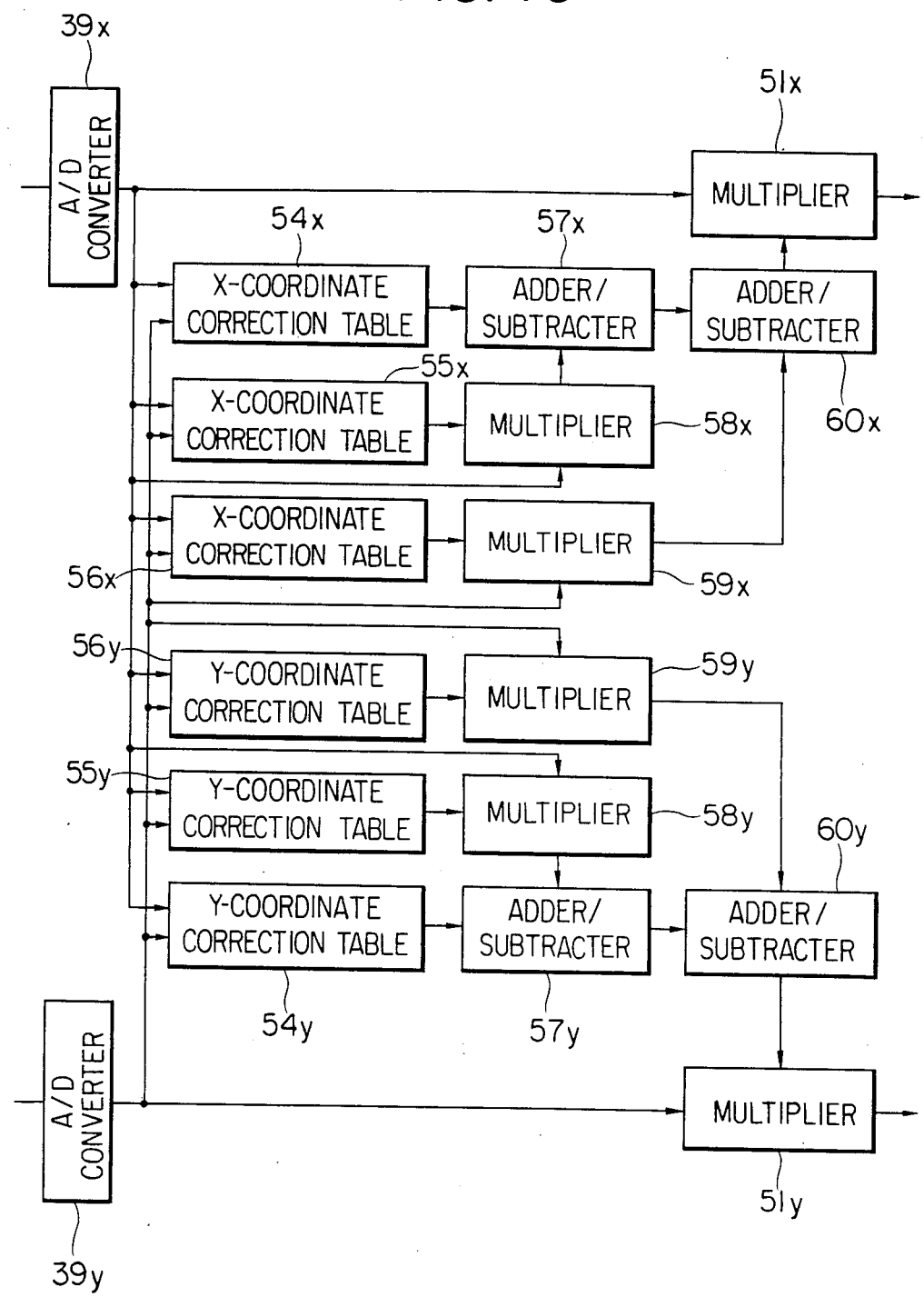
FIG. 15 is a block diagram of a coordinate input device having an interpolation circuit for interpolating coordinate correction coefficients of the input position by using the coordinate correction coefficients of a plurality of representative points according to still another embodiment of the present invention.
Figure 16:
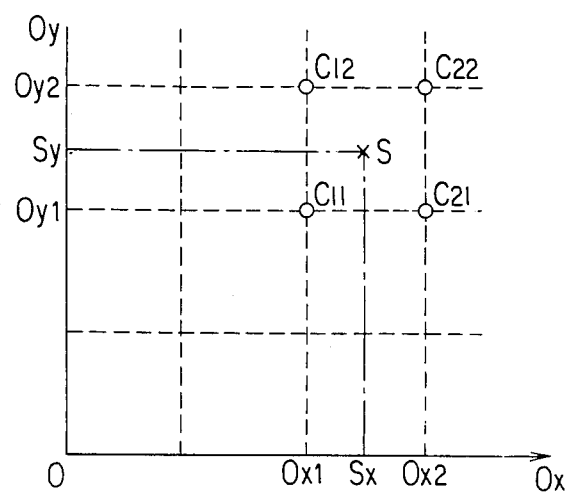
FIG. 16 is a graph for explaining the operation of the interpolation circuit shown in FIG. 15.

FIG. 15 shows a coordinate input device with an obtaining circuit for obtaining coordinate correction coefficients of the input point by interpolating coordinate correction coefficients of a plurality of representative points according to still another embodiment of the present invention. Reference numerals $54_x$ to $56_x$ denote x-coordinate correction tables, respectively; $54_y$ to $56_y$, y-coordinate correction tables, respectively; $57_x$, $57_y$, $60_x$ and $60_y$, adders/subtracters, respectively; and $58_x$, $58_y$, $59_x$ and $59_y$, multipliers, respectively. FIG. 16 shows the principle of interpolation.

Referring to FIG. 16, the x-coordinate signal from the input position detector 36 is plotted along the abscissa, and the y-coordinate signal therefrom is plotted along the ordinate. Intersections between the dotted lines represent coordinates of the representative points with the preset coordinate correction coefficients. The coordinate correction coefficients can be calculated when an x-coordinate signal $S_x$ and a y-coordinate signal $S_y$ are generated by the input position detector 36.

Assume that the x- and y-coordinate correction coefficients of four points $C_{11}$ ($O_{x1}$, $O_{y1}$), $C_{12}$ ($O_{x1}$, $O_{y2}$), $C_{21}$ ($O_{x2}$, $O_{y2}$), $C_{22}$ ($O_{x2}$, $O_{y2}$) near the coordinate signals S are given as $C_{11x}$, $C_{12x}$, $C_{21x}$, $C_{22x}$, $C_{11y}$, $C_{12y}$, $C_{21y}$, $C_{22y}$ x- and y-coordinate correction coefficients $S_{cx}$ and $S_{cy}$ of the coordinate signals S are then given as follows:

$$S_{cx} = a + (b-a) \cdot (S_x - O_{x1})/(O_{x2} - O_{x1})$$

$$S_{cy} = c + (d-c) \cdot (S_y - O_{y1})/(O_{x2} - O_{y1})$$

for $$a = C_{11x} + (C_{12x} - C_{11x}) \cdot (S_y - O_{y1})/(O_{y2} - O_{y1})$$

$$b = C_{21x} + (C_{22x} - C_{21x}) \cdot (S_y - O_{y1})/(O_{y2} - O_{y1})$$

$$c = C_{11y} + (C_{12y} - C_{11y}) \cdot (S_x - O_{x1})/(O_{x2} - O_{x1})$$

$$d = C_{21y} + (C_{22y} - C_{21y}) \cdot (S_x - O_{x1})/(O_{x2} - O_{x1})$$

When these equations are approximated:

$$S_{cx} = C_{11x} + \{(C_{12x} - C_{11x})/(O_{x2} - O_{x1})\} \cdot (S_x - O_{x1}) + \{(C_{12x} - C_{11x})/(O_{y2} - O_y)\} \cdot (S_y - O_{y1}) \quad (1)$$

$$S_{cy} = C_{11y} + \{(C_{12y} - C_{11y})/(O_{x2} - O_{x1})\} \cdot (S_x - O_{x1}) + \{(C_{12y} - C_{11y})/(O_{y2} - O_y)\} \cdot (S_y - O_{y1}) \quad (2)$$

The x- and y-coordinate correction coefficients $S_{cx}$ and $S_{cy}$ are multiplied with the corresponding coordinate signals to correct the digital coordinate signals.

The x-coordinate correction coefficient $S_{cx}$ in equation (1) is a correction coefficient of a representative point of the input surface of the input position detector 36 and is stored in the x-coordinate correction table $54_x$ in FIG. 15. The second term of $(C_{12x}-C_{11x})/(O_{x2}-O_{x1})$ represents an x-direction change in the x-coordinate correction coefficient $S_{cx}$ and is stored in the x-coordinate correction table $55_x$. $(S_x-O_{x1})$ is a difference between the x-coordinate position signal $S_x$ and the coordinate signal $O_{x1}$ representing the readout correction coefficient. The $(C_{12}-C_{11x})/(O_{x2}-O_{x1})$ is multiplied by the multiplier $58_x$ with the difference $(S_x-O_{x1})$. The third term is the same as the second term but represents y-coordinate components. A y-direction change $(C_{12x}-C_{11x})/(O_{y2}-O_{y1})$ of the x-coordinate correction coefficient $S_{cx}$ is stored in the x-coordinate correction table $56_x$ and is multiplied by the multiplier $59_x$ with the y-coordinate difference $(S_y-O_{y1})$. The first to third terms of equation (1) are added by the adders/subtracters $57_x$ and $60_x$. A sum is multiplied by the multiplier $51_x$ with the x-coordinate signal $S_x$, thereby correcting the x-coordinate signal $S_x$. Similarly, the y-coordinate signal $S_y$ can be corrected by the lower half of the circuit of FIG. 15 in accordance with equation (2).

With the above arrangement of this embodiment, even if the coordinate detection error occurs in the input position detector 36, the coordinate correction coefficients stored in the coordinate correction tables can be multiplied to accurately detect the input point with high precision in the same manner as in the device of FIG. 11. At the same time, the coordinate correction tables can be made reduced in volume. In addition, the coordinate correction coefficients are interpolated to further correct the coordinate detected values with higher precision. For illustrative convenience, three x-coordinate correction tables and three y-coordinate correction tables are used in the above description. However, only one x-coordinate correction table and one y-coordinate correction table can be used together with adders and a microprocessor.

In the embodiments of the coordinate input devices with a coordinate correction circuit, as shown in FIGS. 11, 13, 14 and 15, the correction data stored in the input position correction tables are coordinate correction coefficients of representative points on the input surface. These correction coefficients are multiplied with the detection signal to perform correction. However, the correction data may be differences between the coordinates of the input position on the input surface and the corresponding coordinates detected by the input position detector. In this case, the detected values are added and/or subtracted to perform correction.

Figure 17:
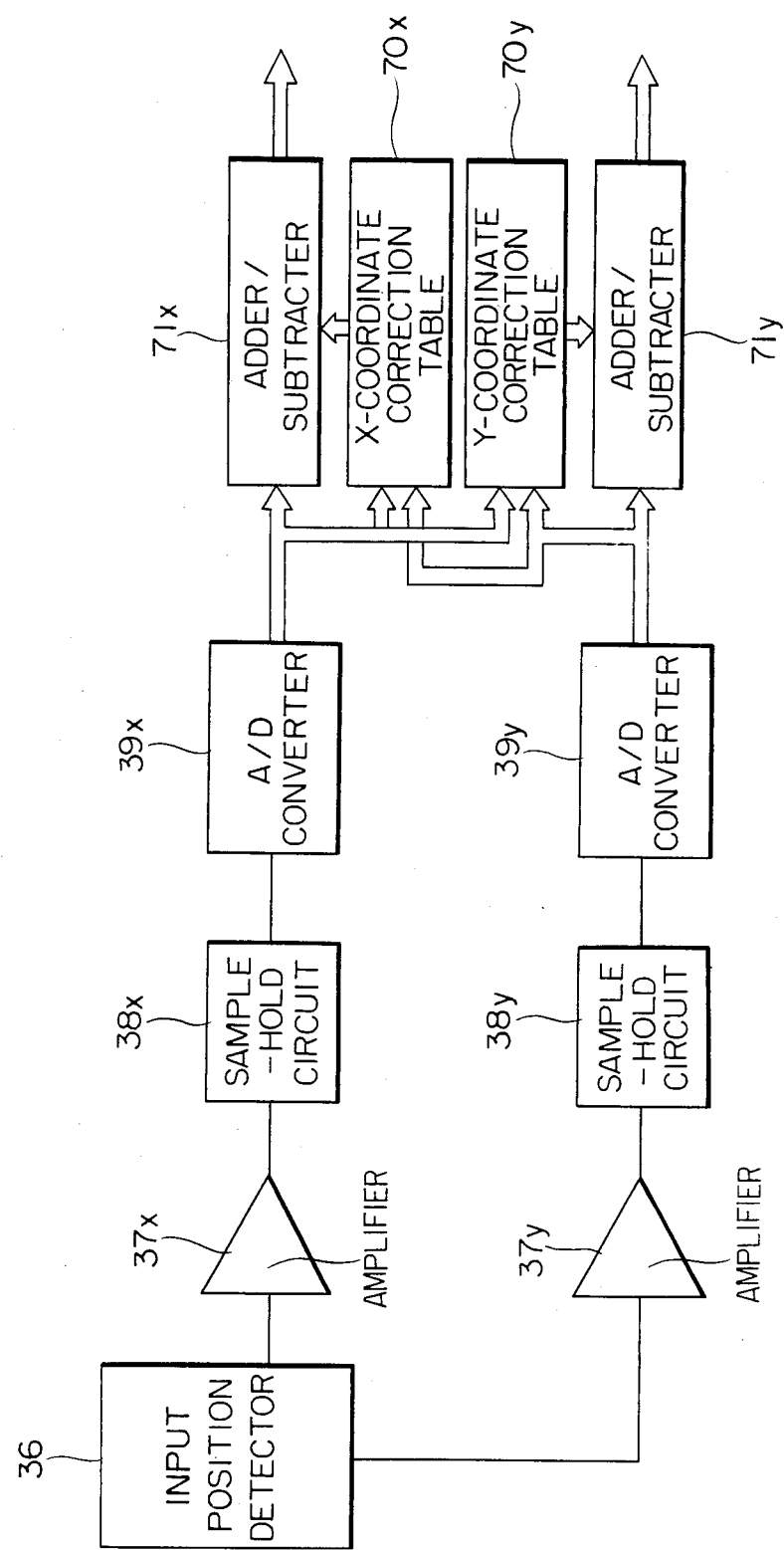
FIG. 17 is a block diagram of a coordinate input device having an input position correction circuit for performing correction by using a coordinate correction table for storing correction differences between the coordinates of the representative points according to still another embodiment of the present invention.

FIG. 17 shows still another embodiment for implementing such correction. Reference numerals $70_x$ and $70_y$ denote x-coordinate correction tables, respectively; and $71_x$ and $71_y$, adders/subtracters, respectively. Other arrangements of the circuit of FIG. 17 are substantially the same as those of FIG. 11.

In operation, x- and y-coordinate signals from an input position detector 36 are amplified by amplifiers $37_x$ and $37_y$ to a predetermined level, respectively. Amplified outputs are sampled and held by sample-hold circuits $38_x$ and $38_y$, respectively. Outputs from the sample-hold circuits $38_x$ and $38_y$ are converted by A/D converters $39_x$ and $39_y$ from analog x- and y-coordinate signals to digital x- and y-coordinate signals. X- and y-coordinate correction differences, corresponding to the x- and y-coordinate signals obtained by supplying the digital x- and y-coordinate signals as address signals to the x- and y-coordinate correction tables $70_x$ and $70_y$, are added/subtracted by the adders/subtractors $71_x$ and $71_y$ with the digital x- and y-coordinate signals, thereby obtaining the corrected x- and y-coordinate signals.

FIG. 12 shows coordinate signals $O_0$ $(O_x,O_y)$ generated by the input position detector 36 upon detection of coordinates $I_0$ $(I_x,I_y)$ In this case, x- and y-coordinate correction differences $D_x$ and $D_y$ are given as follows:

$$D_x=I_x/O_x \text{ and } D_y=I_y/O_y$$

When the x- and y-coordinate correction differences $D_x$ and $D_y$ are written at the addresses $(O_x,O_y)$ of the x- and y-coordinate correction tables $70_x$ and $70_y$, the corrected x- and y-coordinate signals $O_x'$ and $O_y'$ are:

$$O_x'=O_x \times D_x=O_x \times (I_x/O_x)=I_x$$

$$O_y'=O_y \times D_y=O_y \times (I_y/O_y)=I_y$$

The same coordinates as the coordinates $I_0$ $(I_x,I_y)$ entered to the input position detector 36 are generated, thereby correcting the input coordinates.

The coordinate detection error in the input position detector 36 of FIG. 17 is rarely subjected to steep changes, as shown in FIG. 12. Therefore, the coordinate correction differences need not be prepared for the entire surface of the input position detector 36. The coordinate correction differences can be prepared for several representative points of the input surface of the input position detector 36 and can be used to correct input points near the representative points.

Figure 18:
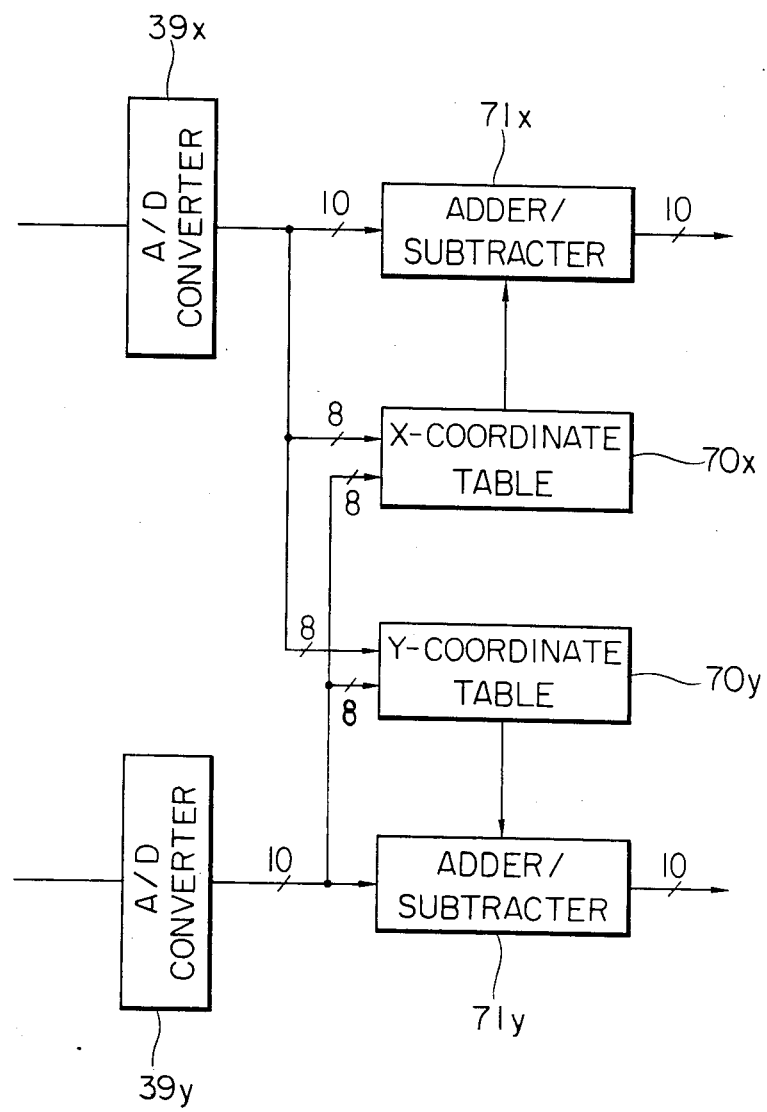
FIG. 18 is a block diagram of a coordinate input device having a table access circuit for accessing a coordinate correction table by using upper bits of the output from an A/D converter according to still another embodiment of the present invention.

FIG. 18 is a circuit diagram for implementing the method described above according to still another embodiment of the present invention. An illustrated portion is a circuit different from the corresponding portion of the circuit of FIG. 17. The resolution of each of A/D converters $39_x$ and $39_y$ is given as 10 bits. 10-bit data from the A/D converters $39_x$ and $39_y$ is supplied to multipliers $71_x$ and $71_y$, respectively. The upper eight bits of each of the digital x- and y-coordinate data are supplied to corresponding x- and y-coordinate correction tables $70_x$ and $70_y$. When the coordinate detection errors are small, the number of bits constituting the data supplied to the x- and y-coordinate correction tables $70_x$ and $70_y$ can be decreased. For this reason, the number of x-coordinate correction differences stored in the x-coordinate correction table $70_x$ is $2^{16}$, 1/16 when the correction differences for all input points are prepared.

With the above arrangement, even if the coordinate detection errors occur in the input position detector 36, the x- and y-coordinate correction differences stored in the x- and y-coordinate correction tables $70_x$ and $70_y$ are added to or subtracted from the output, thereby detecting the input position with high precision.

Figure 19:
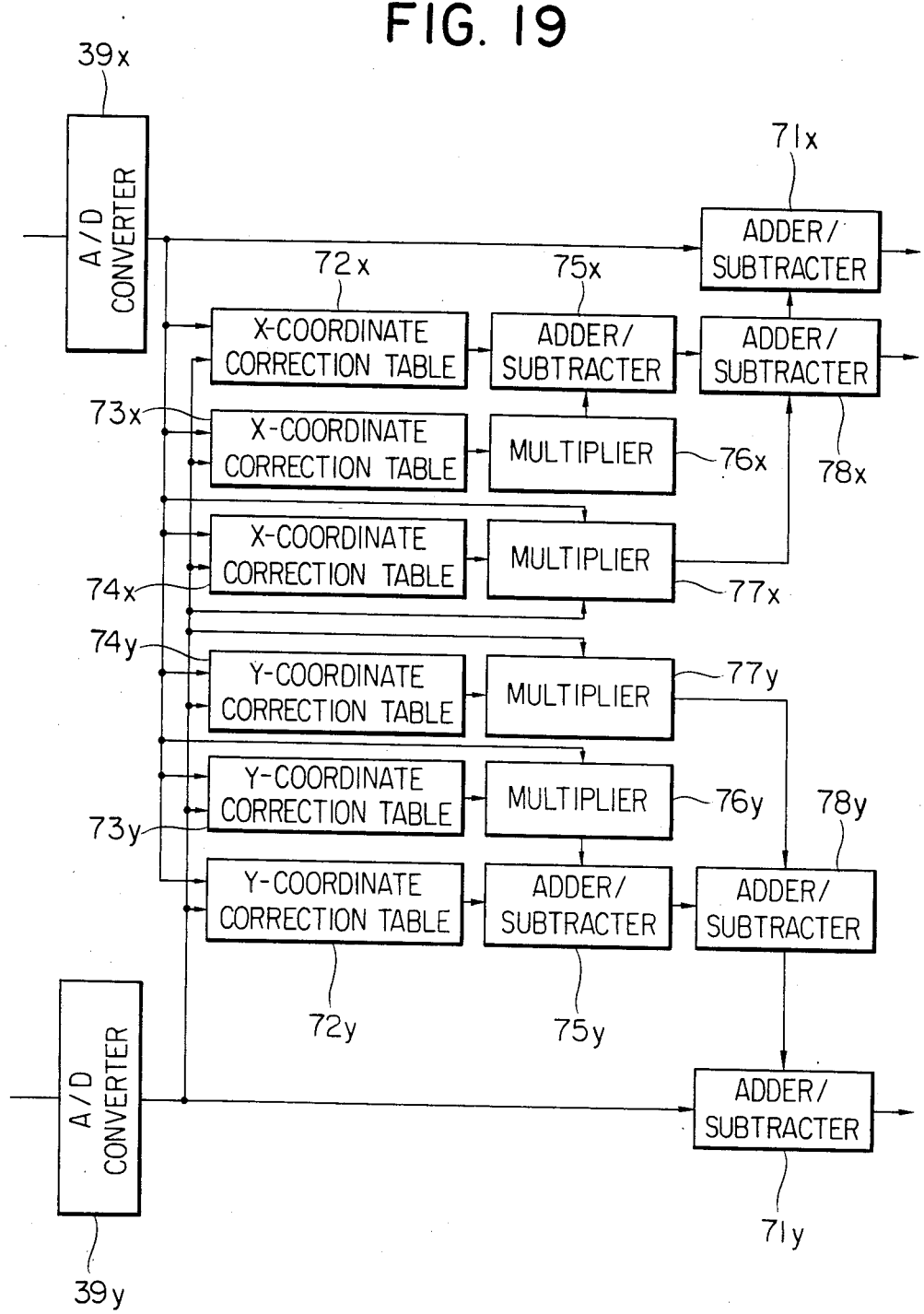
FIG. 19 is a block diagram of a coordinate input device having an interpolation circuit for obtaining coordinate correction differences of input points by interpolating coordinate correction differences of the plurality of representative points.

FIG. 19 shows a coordinate input device with an interpolation circuit for obtaining coordinate correction differences of the input point by interpolating coordinate correction differences of a plurality of representative points according to still another embodiment of the present invention. Reference numerals $72_x$ to $74_x$ denote x-coordinate correction tables, respectively; $72_y$ to $74_y$, y-coordinate correction tables, respectively; $75_x$, $75_y$, $78_x$ and $78_y$, adders/subtracters, respectively; and $76_x$, $76_y$, $77_x$ and $77_y$, multipliers, respectively. The principle of interpolation is substantially the same as that in the embodiment of FIG. 15 described with reference to FIG. FIG. 16.

Referring to FIG. 16, the x-coordinate signal from the input position detector 36 is plotted along the abscissa, and the y-coordinate signal therefrom is plotted along the ordinate. Intersections between the dotted lines represent coordinates of the representative points with the preset coordinate correction differences. The coordinate correction differences can be calculated when an x-coordinate signal $S_x$ and a y-coordinate signal $S_y$ are generated by the input position detector 36. It should be noted that the coefficients C are replaced with the differences D in this embodiment.

Assume that the x- and y-coordinate correction differences of four points $D_{11}$ $(O_{x1}, O_{y1})$, $D_{12}(O_{x1}, O_{y2})$, $D_{21}(O_{x2}, 0_{y2})$, $D_{22}(O_{x2}, O_{y2})$ near the coordinate signals S are given as $D_{11x}$, $D_{12x}$, $D_{21x}$, $D_{22x}$, $D_{11y}$, $D_{12y}$, $D_{21y}$, $D_{22y}$. X- and y-coordinate correction differences $S_{dx}$ and $S_{dy}$ of the coordinate signals S are given as follows:

$$S_{dx} = a + (b-a)\cdot(S_x - O_{x1})/(O_{x2} - O_{x1})$$

$$S_{dy} = c + (d-c)\cdot(S_y - O_{y1})/(O_{y2} - O_{y1})$$

for $$a = D_{11x} + (D_{12x} - D_{11x})\cdot(S_y - O_{y1})/(O_{y2} - O_{y1})$$

$$b = D_{21x} + (D_{22x} - D_{21x})\cdot(S_y - O_{y1})/(O_{y2} - O_{y1})$$

$$c = D_{11y} + (D_{12y} - D_{11y})\cdot(S_x - O_{x1})/(O_{x2} - O_{x1})$$

$$d = D_{21y} + (D_{22y} - D_{21y})\cdot(S_x - O_{x1})/(O_{x2} - O_{x1})$$

When these equations are approximated:

$$S_{dx} = D_{11x} + \{(D_{12x} - D_{11x})/(O_{x2} - O_{x1})\} \cdot (S_x - O_{x1}) + \{(D_{12x} - D_{11x})/(O_{y2} - O_{y})\} \cdot (S_y - O_{y1}) \quad (3)$$

$$S_{dy} = D_{11y} + \{(D_{12y} - D_{11y})/(O_{x2} - O_{x1})\} \cdot (S_x - O_{x1}) + \{(D_{12y} - D_{11y})/(O_{y2} - O_{y})\} \cdot (S_y - O_{y1}) \quad (4)$$

The x- and y-coordinate correction differences $S_{dx}$ and $S_{dy}$ are multiplied with the corresponding coordinate signals to correct the digital coordinate signals.

The x-coordinate correction differences $S_{dx}$ in equation (3) are considered. The first term $D_{11x}$ is a correction difference of a representative point of the input surface of the input position detector 36 and is stored in the x-coordinate correction table $72_x$ in FIG. 19. The second term of $(D_{12x} - D_{11x})/(O_{x2} - O_{x1})$ represents an x-direction change in the x-coordinate correction difference $S_{dx}$ and is stored in the x-coordinate correction table $73_x$. $(S_x - O_{x1})$ is a difference between the x-coordinate position signal $S_x$ and the coordinate signal $O_{x1}$ representing the readout correction difference. $(D_{12} - D_{11x})/(O_{x2} - O_{x1})$ is multiplied by the multiplier $76_x$ with the difference $(S_x - O_{x1})$. The third term is the same as the second term but represents y-coordinate components. A y-direction change $(D_{12x} - D_{11x})/(O_{y2} - O_{y1})$ of the x-coordinate correction difference $S_{dx}$ is stored in the x-coordinate correction table $74_x$ and is multiplied by the multiplier $77_x$ with the y-coordinate difference $(S_y - O_{y1})$. The first to third terms of equation (1) are added by the adders/subtracters $75_x$ and $78_x$. A sum is added by the adder/subtracter 71 to the x-coordinate signal $S_x$, thereby correcting the x-coordinate signal $S_x$. Similarly, the y-coordinate signal $S_y$ can be corrected by the lower half of the circuit of FIG. 19 in accordance with equation (4).

With the above arrangement of this embodiment, even if the coordinate detection error occurs in the input position detector 36, the coordinate correction differences stored in the coordinate correction tables can be subjected to addition/subtraction to accurately detect the input point with high precision in the same manner as in the device of FIG. 17. At the same time, the coordinate correction tables can be reduced in volume. In addition, since the coordinate correction differences are interpolated to further correct the coordinate detected values with higher precision. For illustrative convenience, three x-coordinate correction tables and three y-coordinate correction tables are used in the above description. However, only one x-coordinate correction table and one y-coordinate correction table can be used together with adders and a microprocessor.

As described above, in the embodiments described with reference to FIGS. 11 to 19, the coordinate correction difference data of the representative points of the input surface are stored in correspondence with the input position detection errors inherent to the input position detector. The coordinate correction difference data or the values obtained by interpolating the coordinate correction difference data are added to or subtracted from the coordinate signal. Therefore, the coordinate correction tables can be reduced in volume, and high-precision coordinate detection can be performed. Furthermore, even if the input position detector has a detection error, it can be used as the detector, thereby increasing the yield of the products at low cost.

A coordinate input device as a coordinate input/display device having a transparent coordinate input unit (i.e., a transparent drawing pad) and a coordinate display unit integrally arranged with the the transparent coordinate input unit so as to match an coordinate input point with a coordinate display point will be described according to still another embodiment of the present invention.

Figure 21:
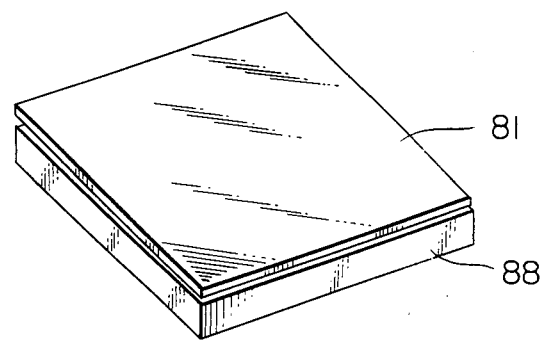
FIG. 21 is a perspective view showing the outer appearance of the device shown in FIG. 20.
Figure 20:
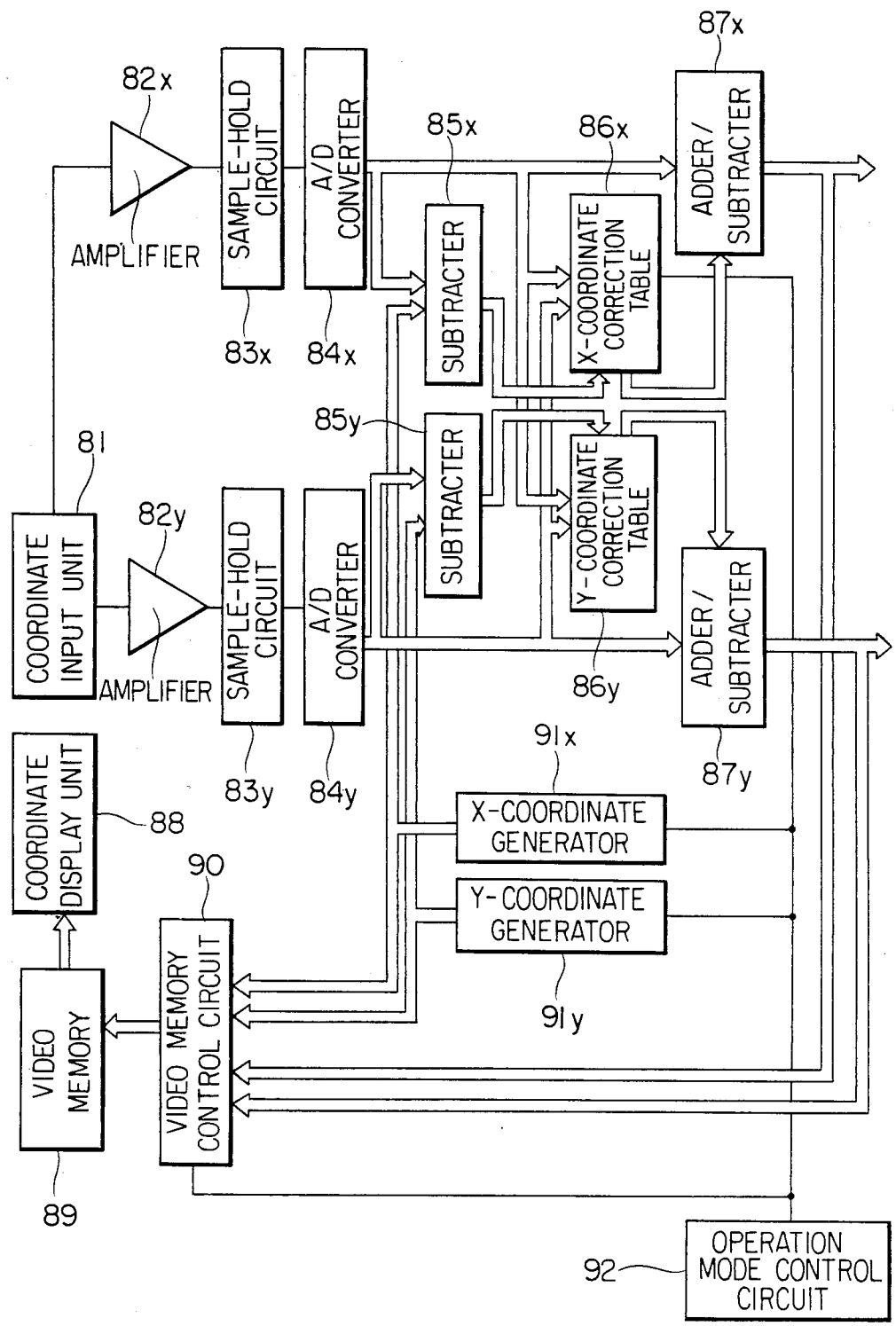
FIG. 20 is a block diagram of a coordinate display device integrally coupled with a coordinate input unit.

FIG. 20 is a block diagram of the coordinate input/display device. Referring to FIG. 20, reference numeral 81 denotes a coordinate input unit of the coordinate input/display device; $82_x$ and $82_y$, amplifiers, respectively; $83_x$ and $83_y$, sample-hold circuits, respectively; $84_x$ and $84_y$, A/D converters, respectively; $85_x$ and $85_y$, subtracters, respectively; $86_x$ and $86_y$, x- and y-coordinate correction tables constituted by programable random-access memories (PRAMs), respectively; $87_x$ and $87_y$, adders/subtracters; 88, a coordinate display unit of the coordinate input/display unit; and 89, a video memory for the coordinate display unit 18. Reference numeral 90 denotes a video memory control circuit; $91_x$, an x-coordinate generator; and $91_y$, a y-coordinate generator. The video memory control circuit 90, the x- and y-coordinate generators 91 and 92 constitute a display circuit. Reference numeral 92 denotes an operation mode control circuit. The coordinate input unit 81 and the coordinate display unit 88 shown in FIG. 20 are integrally formed as shown in FIG. 21. The coordinate input unit 81 and the coordinate display unit 88 are separately illustrated in FIG. 20 for illustrative convenience. The coordinate display unit 88 can comprise a flat display such as a liquid crystal display panel or a plasma display panel.

The coordinate display unit 88 are operated by the operation mode control circuit 92 in one of the two operating modes (i.e., the coordinate input/display mode and the coordinate correction difference write mode).

Assume that x- and y-coordinate correction differences $D_x$ and $D_y$ are prestored in the x- and y-coordinate correction tables $86_x$ and $86_y$, respectively. Also assume that the operation mode control circuit 92 is operated in the coordinate input/display mode, that the x- and y-coordinate correction tables $86_x$ and $86_y$ are set by the operation mode control circuit 92 in the read mode, and that the video memory control circuit 90 selects coordinate data from the adders/subtracters $87_x$ and $87_y$.

X- and y-coordinate signals from the coordinate input unit 81 are amplified by the amplifiers $82_x$ and $82_y$ to a predetermined level, respectively. Amplified outputs are sampled and held by the sample-hold circuits $83_x$ and $83_y$, respectively. Analog outputs from the sample-hold circuits $83_x$ and $83_y$ are converted by the A/D converters $84_x$ and $84_y$ to digital x- and y-coordinate signals. The digital x- and y-coordinate signals are supplied to the x- and y-coordinate correction tables $86_x$ and $86_y$ for storing coordinate correction differences determined by the characteristics of the coordinate input unit 81. The x- and y-coordinate correction differences corresponding to the input data are added to or subtracted from the digital x- and y-coordinate position signals by the adders/subtracters $87_x$ and $87_y$, thereby generating the corrected x- and y-coordinate signals.

The corrected x- and y-coordinate signals from the adders/subtractors $87_x$ and $87_y$ are selected by the video memory control circuit 90 and are selectively written in the video memory 89, thereby displaying the coordinate data on the coordinate display unit 88.

As described above, the x- and y-coordinate correction values stored in the x- and y-coordinate correction tables 86 comprise the differences $D_x$ and $D_y$. The correction technique is the same as that described in the embodiment of FIG. 17, and a detailed description thereof will be omitted.

The coordinate correction value write mode of the circuit shown in FIG. 20 will be described hereinafter. The operation mode control circuit 92 sets the x- and y-coordinate correction tables $86_x$ and $86_y$ in the coordinate correction value write mode, the x- and y-coordinate generators $91_x$ and $91_y$ in an active state, and the video memory control circuit 90 in a mode to select the coordinate data from the x- and y-coordinate generators $91_x$ and $91_y$. One point is displayed by the x- and y-coordinate generators $91_x$ and $91_y$ on the coordinate display unit 88. Three points corresponding to the display screen of the coordinate display unit 88 are entered from the coordinate input unit 81.

Figure 22:
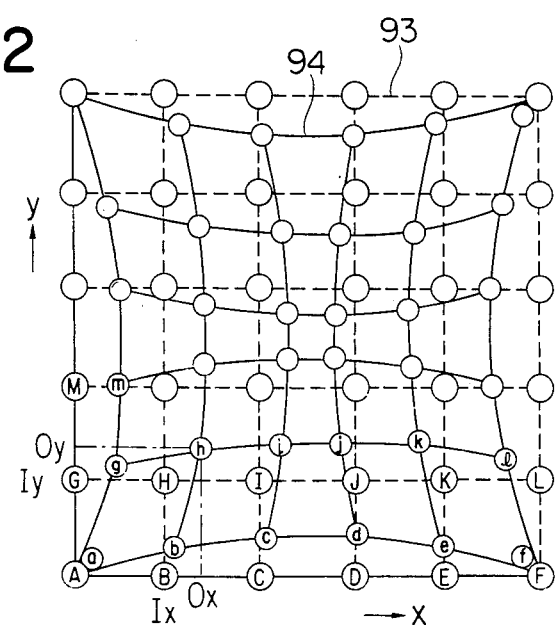
FIG. 22 is a chart for explaining the operation of the device shown in FIG. 20.

FIG. 22 shows the relationship between the coordinate input points and display outputs as the coordinate signals in response to the coordinate inputs. Reference numeral 93 denotes input coordinates; and 94, coordinate detected values. More specifically, when coordinates for points (A), (B), (C), and (D) of FIG. 22 are sequentially generated by the x- and y-coordinate generators $91_x$ and $91_y$ of FIG. 20, the corresponding dots on the coordinate display unit 88 are accordingly turned on, thereby registering the coordinates of points corresponding to the input points on the coordinate input unit 81.

When coordinates are entered for point (H) $(I_x, I_y)$ in FIG. 22 which is turned on, x- and y-coordinate signals $O_x$ and $O_y$ are generated by the coordinate input unit 81. Referring to FIG. 20, digital x- and y-coordinate signals $O_x$ and $O_y$ converted by the A/D converters $84_x$ and $84_y$ are generated. The x-coordinate signal $O_x$ is subtracted by the subtracter $85_x$ from the digital x-coordinate signal $I_x$ generated by the x-coordinate generator 91 to produce the difference $(I_x - O_x)$. The difference $(I_x - O_x)$ is written as x-coordinate correction value at the address $(O_x, O_y)$ of the x-coordinate table $86_x$. Similarly, the y-coordinate signal $O_y$ is subtracted from the digital coordinate signal $I_y$ generated by the y-coordinate generator 91 to obtain a difference $(I_y - O_y)$. The difference $(I_y - O_y)$ is stored at the address $(O_x, O_y)$. The above operation is repeated for the coordinates of the representative points in the coordinate input unit 81, thereby preparing the x- and y-coordinate correction tables $86_x$ and $86_y$.

With the above arrangement, even if a coordinate detection error occurs in the coordinate input unit 81 of the coordinate input/display device, the coordinate detection error can be corrected by the coordinate correction differences stored in the x- and y-coordinate correction tables $86_x$ and $86_y$. Therefore, the input coordinates 93 can be detected with high precision. After the coordinate input unit 81 is formed integrally with the coordinate display unit 88, the correction is performed, so that the coordinate input point matches with the display point, thereby allowing effective entering of coordinate data and decreasing the adjustment cost.

The two sample-hold circuits $83_x$ and $83_y$ and the two A/D converters circuits $84_x$ and $84_y$ are used for illustrative convenience. However, when the x- and y-coordinate signals are time-divisionally driven, only one sample-hold circuit and one A/D converter are required. Furthermore, even if the coordinate display unit 18 has a unit such as a CRT with a peripheral display distortion, errors of the coordinate input unit 81 and the coordinate display unit 88 can be corrected by the x- and y-coordinate generators as a whole.

In the device shown in FIG. 20, a portion of the correction circuit constituted by the x- and y-coordinate correction tables $86_x$ and $86_y$ is arranged in the same manner as in the correction circuit of FIG. 19. The same effect as in the device of FIG. 19 can be obtained in the device of FIG. 20.

The coordinate correction data stored in the coordinate correction tables in the device of FIG. 20 is exemplified by difference data. However, as shown in the respective embodiments in FIGS. 11 to 15, the coordinate correction coefficients can be used in place of the difference data. In this case, the x- and y-coordinate correction tables $86_x$ and $86_y$ of FIG. 20 are replaced with the x- and y-coordinate correction tables $50_x$ and $50_y$ in FIG. 11; the adders/subtracters $87_x$ and $87_y$, with the multipliers $51_x$ and $51_y$; and the subtracters $85_x$ and $85_y$, with dividers.

In the device of this embodiment as described above, a high-precision transparent drawing pad overlaps a flat display panel such as a liquid crystal display panel or a plasma display panel. An input character or graphic pattern can be checked on the flat display. Further, since coordinate correction is performed, the input position of the transparent drawing pad matches with the display position on the flat display irrespective of the input conditions of the electrical pen. Therefore, the operator can easily add or erase character and graphic patterns, resulting in convenience. The coordinate signals generated by the coordinate generators and the coordinate input unit are displayed on the coordinate display unit. The coordinate signals corresponding to the displayed points are generated by the coordinate input unit upon registration of the coordinates representing the displayed points and are calculated to derive a coordinate correction value which is then stored in the coordinate correction table. The coordinate input/display device uses the coordinate correction value to correct a coordinate signal from the coordinate input unit. The coordinate input point thus matches with the the displayed point, and the coordinate input operation is easy. At the same time, high-precision coordinate position detection can be performed. Even if the coordinate input unit and the coordinate position detector are subjected deterioration over time, the coordinate correction tables can be easily updated.

Figure 23:
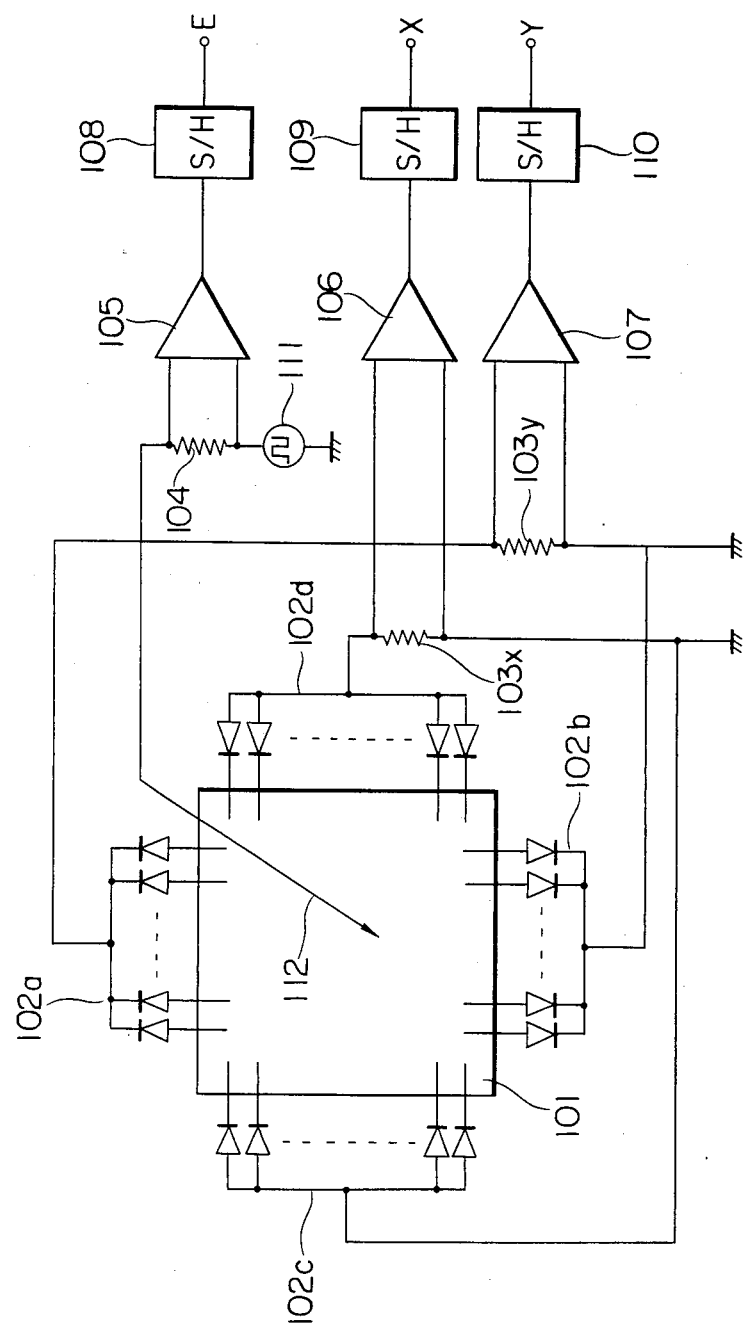
FIG. 23 is a block diagram of a coordinate input device for detecting an input position upon application of an AC voltage to a transparent resistor film.

In each embodiment described above, a DC voltage is applied across the transparent resistor film to detect the coordinates. However, an AC voltage may be used to detect the coordinates, as exemplified in FIGS. 23 and 24. FIG. 23 is a block diagram of a coordinate input device driven with an AC voltage, and FIG. 24 is a timing chart for explaining the operation thereof.

Referring to FIG. 23, x-coordinate detection electrodes 102c and 102d in a transparent input panel 101 are arranged along the current flow-in direction, and y-coordinate detection electrodes 102a and 102b are arranged along the current flow-out direction. An AC power source (a rectangular wave power source) 111 is connected to an electrical pen 112 through a detection resistor 104. Both ends of the detection resistor 104 are connected to inputs of an operational amplifier 105, and the output thereof is connected to the input of a sample-hold circuit 108. The detection electrodes 102b and 102c are grounded. Detection resistors $103_x$ and $103_y$ are connected between the detection electrode 102a and ground and between the detection electrode 102d and ground, respectively. Both ends of the detection resistors $103_x$ and $103_y$ are connected to the inputs of operational amplifiers 106 and 107. The outputs of the operational amplifiers 106 and 107 are connected to the inputs of sample-hold circuits 109 and 110, respectively. When a rectangular wave signal with an amplitude of $\pm E$ (FIG. 24) is supplied from the AC power source 111 to the transparent resistor film through the electrical pen 112, rectangular wave currents with amplitudes of $-i_x$ and $i_y$ flow through the detection resistors $103_x$ and $103_y$, respectively. Rectangular wave currents with amplitudes of $-i_x$ and $+i_y$ flow through the detection resistor 104. The x- and y-coordinates can be given by these currents:

$$x = i_x/i_{ex}$$

$$y = i_y/i_{ey}$$

Among outputs E, X and Y from the sample-hold circuits 108, 109 and 110, the outputs E and X are proportional to the currents $i_{ex}$ and $i_x$ during the negative period of the voltage, and the outputs E and Y are proportional to the currents $i_{ey}$ and $i_y$ during the positive period of the voltage. Therefore, the currents $i_x$ and $i_y$ are divided by the currents $i_{ex}$ and $i_{ey}$ to detect the x and y coordinates, respectively.

What is claimed is:

1. A transparent coordinate input device comprising:
   a transparent insulating substrate;
   a flat transparent resistor film of a rectangular shape on said substrate;
   detection electrodes, electrically connected to four sides of said transparent resistor film, for causing a current to flow along one of current flow-in or flow-out directions with respect to said transparent resistor film;
   a transparent protective layer on an upper surface of said transparent resistor film and having a planar resistance substantially higher than the resistance in the direction of the thickness thereof;
   a conductive electrical pane for specifying an input position on said transparent resistor film;
   a DC power source circuit, electrically connected to said electrical pen, for supplying a DC drive current to said transparent resistor film from the input position; and
   detecting means, connected to said detection electrodes, for detecting coordinates of the input position specified by said electrical pen in accordance with outputs from said detection electrodes.

2. A device according to claim 1 wherein said transparent protective layer has a planar resistance greater than that of said transparent resistor film.

3. A device according to claim 1 wherein said transparent protective layer is a transparent pressure conductive sheet whose input position is rendered electrically conductive in the direction of thickness thereof upon application of a pressure exceeding a predetermined pressure to said input positon.

4. A device according to claim 1 wherein said transparent protective layer is obtained such that a number of thin conductors are embedded in a transparent insulating sheet, said thin conductors having a longitudinal direction aligned with a direction of thickness of said transparent insulating sheet.

5. A device according to claim 1, wherein
   said power source circuit comprises a drive voltage power source, one end of which is connected to said electrical pen and a pair of constant current circuits for setting constant currents flowing between the input position and a pair of opposing detection electrodes of said detection electrodes, and
   said detecting means comprises a pair of operation circuits for detecting a potential difference between said pair of opposing detection electrodes and generating a signal representing the input position specified by said electrical pen.

6. A device according to claim 5, wherein said detecting means comprises said pair of constant current circuits and said pair of operation circuits for alternately detecting x- and y-coordinates, and a detection control circuit for controlling switching between two pairs of opposing detection electrodes of said detection electrodes.

7. A device according to claim 5, wherein said detecting means comprises a detection discriminator for discriminating as a true input position a detection result generated by said operating circuits when a potential at said detection electrode reaches a predetermined value.

8. A transparent coordinate input device comprising:
   a transparent insulating substrate;

a flat transparent resistor film of a rectangular shape which is formed on said substrate;

detection electrodes, electrically connected to four sides of said transparent resistor film, for causing a current to flow along one of current flow-in and flow-out directions with respect to said transparent resistor film;

a conductive electrical pen for specifying an input position on said transparent resistor film;

a power source circuit, electrically connected to said electrical pen, for supplying a drive current to said transparent resistor film from the input position;

detecting means, connected to said detection electrodes, for detecting coordinates of the input position specified by said electrical pen in accordance with outputs from said detection electrodes; and correcting means for correcting an input position detection error as a difference between the input position specified by said electrical pen and a detected position detected by said detecting means.

9. A device according to claim 8, wherein said correcting means comprises a converter for converting an analog signal from said detecting means into a digital signal.

10. A device according to claim 9, wherein said correcting means comprises a correction table for storing correction data representing a relationship between input coordinate signals $I_x$ and $I_y$ representing the input position and output coordinate signals $O_x$ and $O_y$ of the position detected by said detecting means, and operating means for eliminating the input position detection error by accessing said correction table in response to the output coordinate signals $O_x$ and $O_y$ to correct the input coordinate signals $I_x$ and $I_y$.

11. A device according to claim 10, wherein said correction table comprises an x-coordinate correction table for storing x-coordinate correction data representing the relationship between an input x-coordinate signal $I_x$ representing the input position and an output x-coordinate signal $O_x$ representing the detected position detected by said detecting means, and an y-coordinate correction table for storing y-coordinate correction data representing the relationship between an input y-coordinate signal $I_y$ representing the input position and an output y-coordinate signal $O_y$ representing the detected position detected by said detecting means.

12. A device according to claim 10, wherein said correction table comprises an x-coordinate correction table for storing x-coordinate correction data representing the relationship between input x- and y-coordinate signals $I_x$ and $I_y$ representing the input position and an output x-coordinate signal $O_x$ representing the detected position detected by said detecting means, and a y-coordinate correction table for storing y-coordinate correction data representing the relationship between the input x- and y-coordinate signals $I_x$ and $I_y$ representing the input position and an output y-coordinate signal $O_y$ representing the detected position detected by said detecting means.

13. A device according to claim 9, wherein said correcting means comprises a correction table for storing coordinate correction coefficients $C_x$ ($=I_x/O_x$) and $C_y(=I_y/O_y)$ as ratios of input coordinate signals $I_x$ and $I_y$ representing the input position to output coordinate signals $O_x$ and $O_y$ representing the detected position detected by said detecting means, said correction table being accessed by address signals formed by the output coordinate signals $O_x$ and $O_y$ representing the detected position, and a multiplier for multiplying the output coordinate signals $O_x$ and $O_y$ from said detecting means with corresponding coordinate correction coefficients $C_x$ and $C_y$ read out from said correction table in response to the output coordinate signals $O_x$ and $O_y$.

14. A device according to claim 13, wherein said correction table stores the coordinate correction coefficients $C_x$ and $C_y$ for only a plurality of representative points on an obtaining input coordinate plane, and said correction table is addressed in response to upper bits of the output coordinate signals $O_x$ and $O_y$ from said detecting means.

15. A device according to claim 13, wherein said correction table is provided with an offset table for storing offset values $O_{xOFF}$ and $O_{yOFF}$ as differences between the output coordinate signals $O_x$ and $O_y$ and the coordinates of the nearest representative point and for reading out the offset values $O_{xOFF}$ and $O_{yOFF}$ in response to the output coordinate signals $O_x$ and $O_y$ as address signals, and a subtracter for subtracting from the output coordinate signals $O_x$ and $O_y$ the offset values $O_{xOFF}$ and $O_{yOFF}$ read out from said offset table, an output ($O_x - O_{xOFF}$) from said subtracter being used as address data to access said correction table.

16. A device according to claim 9, wherein said correcting means comprises a correction table for storing coordinate correction coefficients for a plurality of representative points on an input coordinate plane, an interpolation circuit for obtaining input coordinate correction coefficients of any input position by interpolating reference coordinate correction coefficients $C_{11x}$, $C_{12x}$, $C_{21x}$, $C_{22x}$, $C_{11y}$, $C_{12y}$, $C_{21y}$ and $C_{22y}$ of the plurality of representative points $C_{11}$, $C_{12}$, $C_{21}$ and $C_{22}$ nearest to the input point, and a multiplier for multiplying the output coordinate signals $S_x$ and $S_y$ from said detecting means with interpolating coordinate correction coefficients $S_{cx}$ and $S_{cy}$ from said interpolation circuit.

17. A device according to claim 16, wherein said interpolation circuit has a memory for storing changes in x- and y-coordinate correction coefficients.

18. A device according to claim 9, wherein said correcting means comprises a correction table for storing coordinate correction differences $D_x (=I_x-O_y)$ and $D_y$ ($=I_y-O_y$) between the input coordinate signals $I_x$ and $I_y$ representing the input position and the output coordinate signals $O_x$ and $O_y$ representing the detected position detected by said detecting means, said correction table being accessed in response to address signals derived from the output coordinate signals $O_x$ and $O_y$ representing the detected position, and an adder/subtracter for adding/subtracting to/from the output coordinate signals $O_x$ and $O_y$ from said detecting means corresponding coordinate correction differences $D_x$ and $D_y$ read out from said correction table in response to the output coordinate signals $O_x$ and $O_y$.

19. A device according to claim 18, wherein said correction table stores the coordinate correction differences for only a plurality of representative points on an input coordinate plane and reads out the coordinate correction differences $D_x$ and $D_y$ therefrom in response to as address data the upper bits of the output coordinate signals $O_x$ and $O_y$ from said detecting means.

20. A device according to claim 9, wherein said correcting means comprises a correction table for storing coordinate correction differences for a plurality of representative points on an input coordinate plane, an interpolation circuit for obtaining input coordinate correction differences of any input position by interpolating reference coordinate correction coefficients $C_{11x}$, $C_{12x}$, $C_{21x}$, $C_{22x}$, $C_{11y}$, $C_{12y}$, $C_{21y}$ and $C_{22y}$ of the plurality of representative points $C_{11}$, $C_{12}$, $C_{21}$ and $C_{22}$ nearest to the input point, and a multiplier for multiplying the output coordinate signals $S_x$ and $S_y$ from said detecting means with interpolating coordinate correction differences $S_{dx}$ and $S_{dy}$ from said interpolation circuit.

21. A transparent coordinate input/display device comprising:
- a coordinate input unit having a transparent insulating substrate, a flat transparent resistor film of a rectangular shape which is formed on said substrate, and detection electrodes, electrically connected to four sides of said transparent resistor film, for causing a current to flow along one of current flow-in and flow-out directions with respect to said transparent resistor film;
- a conductive electrical pen for specifying an input position on said transparent resistor film;
- a power source circuit, electrically connected to said electrical pen, for supplying a drive current to said transparent resistor film from the input position;
- detecting means, connected to said detection electrodes, for detecting coordinates of the input position specified by said electrical pen in accordance with outputs from said detection electrodes;
- correcting means for correcting an input position detection error as a difference between the input position specified by said electrical pen and a detected position detected by said detecting means;
- a coordinate display unit integrally formed with said coordinate input unit so as to overlap a coordinate input plane with a coordinate display screen, so that an input point on the coordinate input plane of said transparent resistor film in said coordinate input unit is displayed at an identical position on the coordinate display screen; and
- correction data input means for entering the coordinate correction data in said coordinate correction table.

22. A device according to claim 21, wherein said correction data input means comprises a coordinate generator for generating digital coordinate data, means for causing said coordinate display unit to display a point specified by an output from said coordinate generator, an operation circuit for calculating the coordinate data detected by said coordinate input unit and the coordinate data from said coordinate generator to obtain coordinate correction data, and means for causing said coordinate correction table to store an output from said operation circuit.

23. A device according to claim 22, wherein said operation circuit comprises a subtracter for calculating differences between the coordinate data from said coordinate generator and the detected coordinate data from said coordinate input unit and for generating the coordinate correction difference.

24. A device according to claim 22, wherein said operation circuit comprises a divider for calculating ratios of the coordinate data from said coordinate generator to the detected coordinate data from said coordinate input unit and for generating a coordinate correction coefficient.

* * * * *